United States Patent [19]
Tsukada

[11] Patent Number: 5,177,637
[45] Date of Patent: Jan. 5, 1993

[54] FOCUSING SCREEN INCLUDING DIFFERENT HEIGHT MICROLENSES ARRANGED IN A CYCLICAL PATTERN

[75] Inventor: Shinichi Tsukada, Toride, Japan
[73] Assignee: Nikon Corporation, Tokyo, Japan
[21] Appl. No.: 756,031
[22] Filed: Sep. 6, 1991

[30] Foreign Application Priority Data

Sep. 11, 1990 [JP] Japan .................................. 2-239089
Dec. 21, 1990 [JP] Japan .................................. 2-412770
Mar. 28, 1991 [JP] Japan .................................. 3-087298

[51] Int. Cl.⁵ .......................... G02B 5/02; G02B 27/40
[52] U.S. Cl. .................................... 359/599; 359/619; 354/200
[58] Field of Search ............... 359/619, 625, 626, 599, 359/569, 707, 837, 831, 900, 893

[56] References Cited

U.S. PATENT DOCUMENTS

| | | | |
|---|---|---|---|
| 4,421,398 | 12/1983 | Suzuki et al. | 354/200 |
| 4,427,265 | 1/1984 | Suzuki et al. | 359/599 |
| 4,519,686 | 5/1985 | Seki et al. | 354/200 |
| 4,871,242 | 10/1989 | Sousa et al. | 359/707 |
| 4,946,252 | 8/1990 | Sugawara | 359/619 |
| 4,982,214 | 1/1991 | Matsui | 354/200 |
| 5,074,649 | 12/1991 | Hamanaka | 359/619 |
| 5,081,545 | 1/1992 | Sugawara et al. | 354/200 |
| 5,089,835 | 2/1992 | Kitagishi | 359/569 |

FOREIGN PATENT DOCUMENTS 55-90931 7/1980 Japan.
57-148728 9/1982 Japan.
63-221329 9/1988 Japan.

OTHER PUBLICATIONS

"Light Diffuser with Controlled Divergence", IBM Tech. Dis. Bull., vol. 29, No. 1, Jun. 1986 (359/619).

Primary Examiner—Jon W. Henry
Attorney, Agent, or Firm—Shapiro and Shapiro

[57] ABSTRACT

In a focusing screen having a large number of microlenses regularly arranged thereon, heights of microlenses are n different values. The microlenses having the same height are cyclically arranged. In another aspect, the heights of the microlenses in a similar focusing screen are randomly distributed over ranges centered on n central values, and the microlenses having the same central value are cyclically arranged. In still another aspect, in a method of manufacturing a focusing screen having micropatterned projections by a so-called proximity exposure method, dimensions of the micropatterns of the mask vary centered on the n different values, and the micropatterns having the same central values are cyclically arranged.

8 Claims, 24 Drawing Sheets

K=1.0

K=0.66

K=0.55

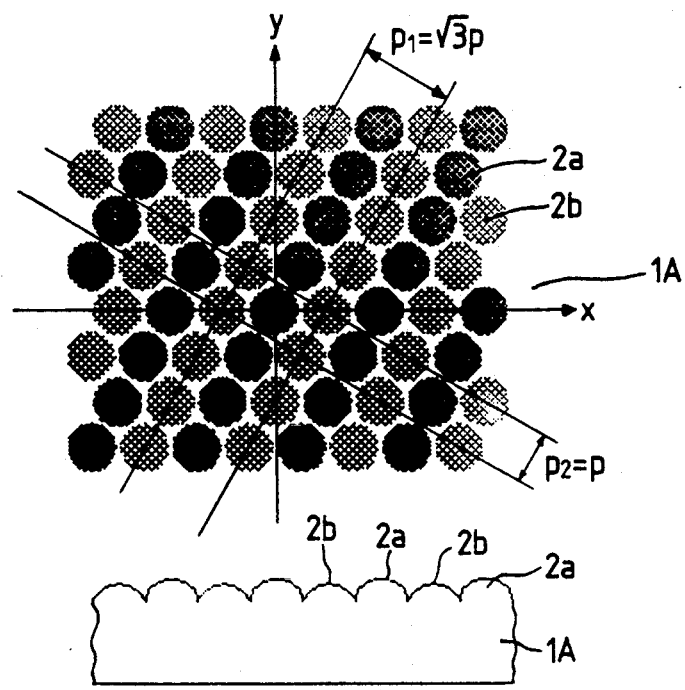
FIG. 13A
FIG. 13B
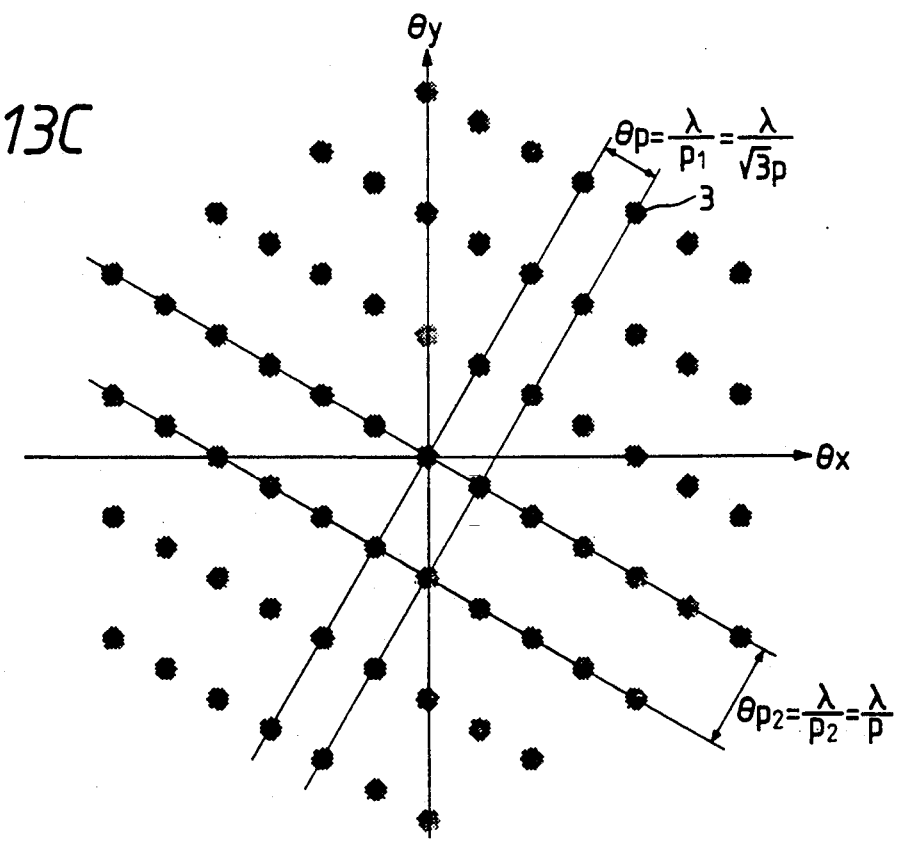
FIG. 13C

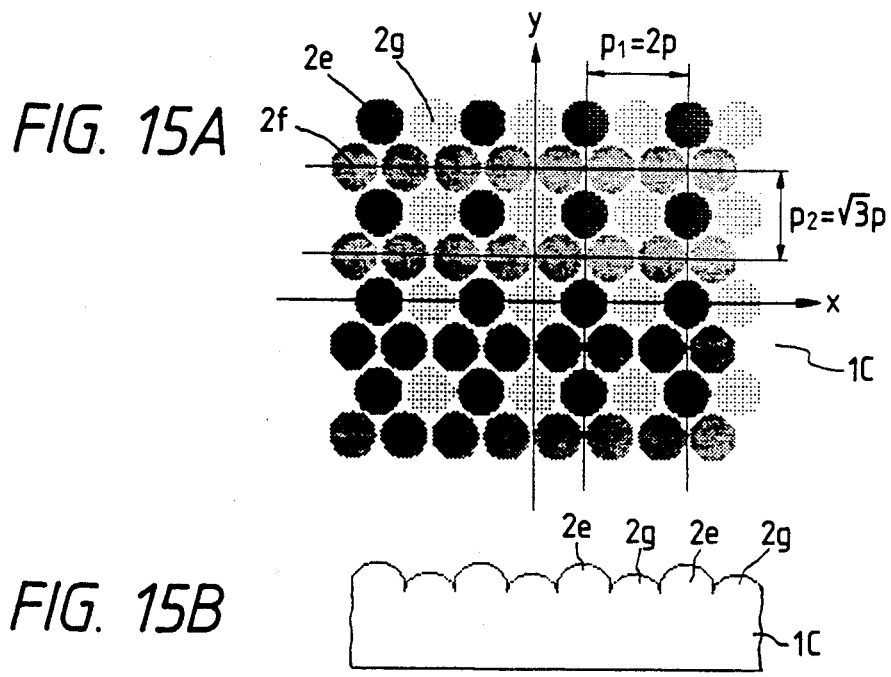
FIG. 15A
FIG. 15B
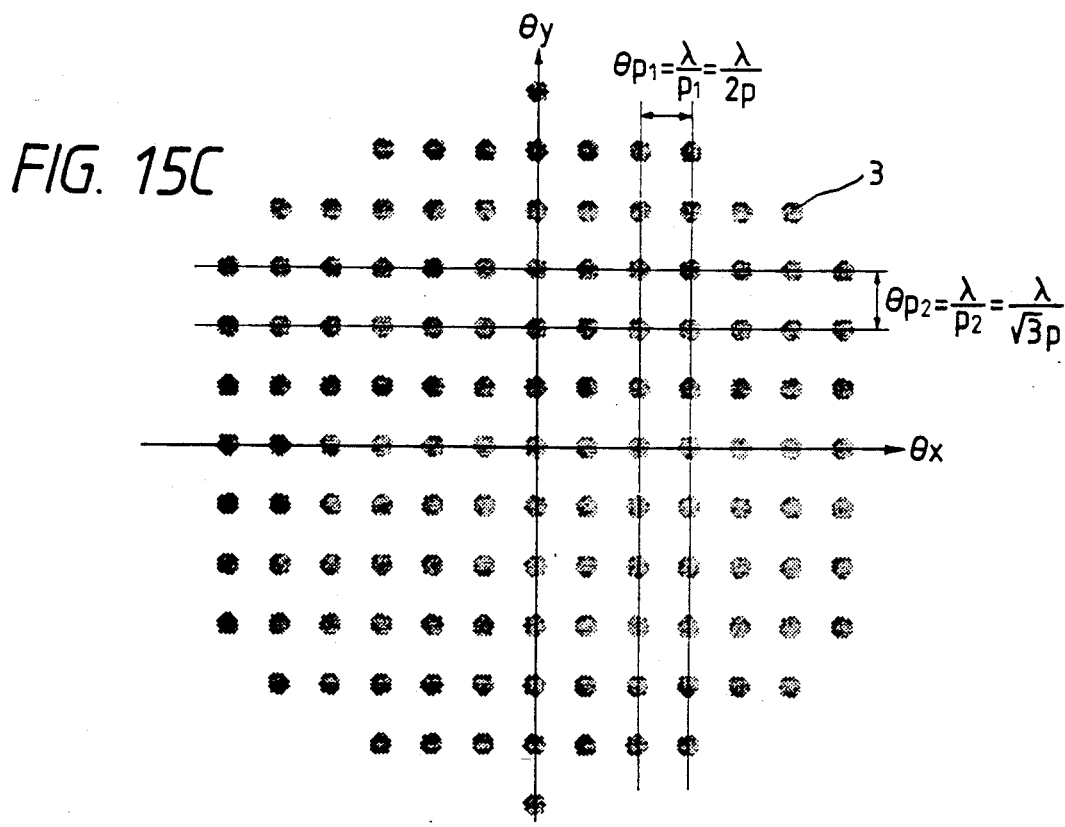
FIG. 15C

FOCUSING SCREEN INCLUDING DIFFERENT HEIGHT MICROLENSES ARRANGED IN A CYCLICAL PATTERN

BACKGROUND OF THE INVENTION

1. Field of the Invention

The present invention relates to a focusing screen used in a single-lens reflex camera or the like, and a method of manufacturing the focusing screen.

2. Related Background Art

A conventional focusing screen for a single-lens reflex camera or the like is manufactured by a method of grinding the surface of a base material such as glass to form micropatterned projections, forming a mold from the resultant master, and transferring the micropatterned projections on the surface of a plastic material. This focusing screen has an advantage in an natural defocus effect, but has disadvantages in that the finder is dark and the coarse texture is conspicuous because the micropatterned projections on the surface of the focusing screen are formed highly at random.

Another conventional focusing screen is proposed in Japanese Patent Laid-Open Application No. 55-90931 wherein the random pattern is eliminated by cyclically arranging microlenses.

FIGS. 1A, 1B, and 1C are views for explaining a focusing screen of this type. FIG. 1A shows a cyclic array of microlenses 2 each having a predetermined height h. A central position (x,y) of the microlens 2 is defined by coordinates determined by a pitch p and a pair of integers (i,j) as follows:

$$x = p \times (i + j/2) \quad \text{Eq. 1-1}$$

$$y = p \times (j \times \sqrt{3}/2) \quad \text{Eq. 1-2}$$

Since the diffusion distribution is preferably isotropic, each microlens 2 preferably has a circular circumferential shape. The above arrangement represents an array of circles at a maximum density in a two-dimensional space. A sectional view of the array taken along the x-axis is shown in FIG. 1B. FIG. 1C shows an array of bright points of the diffusion distribution obtained when the array of the microlenses 2 is given as shown in FIG. 1A. Angular coordinate values $(\theta_x, \theta_y)$ of the center of each bright point are determined by an angular pitch $\theta_p$ and a pair (i,j) of integers as follows:

$$\theta_x = \theta_p \times (i) \quad \text{Eq. 2-1}$$

$$\theta_y = \theta_p \times (-i/\sqrt{3} + 2 \times j/\sqrt{3}) \quad \text{Eq. 2-2}$$

The pitches p of the microlenses 2 and the angular pitches $\theta_p$ of the bright point array of the diffusion distribution satisfy the following relation:

$$\theta_p = \lambda/p \quad \text{Eq. 3}$$

Thus, the angular pitch $\theta_p$ is proportional to a reciprocal of the pitch p. In the above equation, $\lambda$ represents the wavelength of light.

The focusing screen having the above arrangement is free from the coarse texture and is bright. However, this focusing screen has a disadvantage in an unnatural defocus phenomenon such as multi-line defocusing due to the following reason. Since this focusing screen has a cyclic structure, it has the same function as that of a diffraction grating. Diffused light is limited to a specific direction corresponding to the orders of diffraction.

Since the above diffraction effect is caused by the cyclic microlens array, a method of providing an appropriate random pattern to the cyclic microlens array is proposed in Japanese Patent Laid-Open Application No. 63-221329. In order to eliminate the unnatural defocus phenomenon according to this method, a considerably conspicuous random pattern is required. When an extremely conspicuous random pattern is used, the density of the microlens array becomes nonuniform. As a result, narrow-angled diffusion light (i.e., diffusion light close to light directly passing through the lens without any diffraction) is increased. As a result, it is difficult to perform a focusing operation.

A diffraction effect caused by the cyclic microlens array will be described in detail below. The diffusion light is limited to a direction corresponding to the degree of diffraction in accordance with the diffraction effect, as described above. These conditions are shown in FIGS. 2A, 2B, and 2C. As shown in FIG. 2A, assume that microlenses 2 are cyclically arranged at pitches p (the sectional view along the x-axis is shown in FIG. 2B). Diffusion light is cyclically arranged as bright points 3 at pitches $\theta_p$ in accordance with the diffraction effect, as shown in FIG. 2C. FIG. 2C shows an angular space, in which the pitches p of the microlenses 2 and the angular pitches $\theta_p$ of the bright point array of the diffusion distribution satisfy the following relation:

$$\theta_p = \lambda/p \quad \text{Eq. 4}$$

where $\lambda$ is the wavelength of light. When the defocus state of a point light source is observed through a focusing screen having such a diffusion distribution, a defocus image is also observed as an aggregate of bright points. Since a linear object is regarded as an object in which point light sources are linearly aligned, a defocus image of the linear object is an array of defocus images of point light sources. As a result, a so-called multi-line defocus state occurs. Since an arbitrary object is regarded as an aggregate of point light sources, a defocus image of the arbitrary object becomes unnatural accordingly. When bright points 3 in FIG. 2C are numbered, and x and y angular coordinates of the center of the ith bright point are defined as $\theta_{xi}$ and $\theta_{yi}$, x and y coordinates xi and yi of the center of the bright point of the defocus image of the point light source corresponding to this bright point 3 are given as follows:

$$xi = \beta \cdot \Delta d \cdot \theta_{xi} \quad \text{Eq. 5-1}$$

$$yi = \beta \cdot \Delta d \cdot \theta_{yi} \quad \text{Eq. 5-2}$$

where $\beta$ is the magnification of an observation system, and $\Delta d$ is the defocus amount. If the defocus amount $\Delta d = 0$, i.e., if an in-focus state is obtained, $xi = yi = 0$ for all bright points i. This indicates that an image of a point light source is observed as one point. Eqs. 5-1 and 5-2 represent that a defocus image of a point object is similar to the diffusion distribution of FIG. 1C. When a distance between bright points in the diffusion distribution is small, a distance between the bright points of the defocus image is small. When the distance between the bright points is small, the number of bright points is increased, and the brightness of each bright point is decreased in inverse proportion to the increase in the number of bright points. As a result, the bright points are less conspicuous. The defocus state becomes more natural when the bright points are less conspicuous.

The distance $\theta_p$ between the bright points in the diffusion distribution is proportional to a reciprocal of the array pitch p of the microlenses, as indicated by Eq. 4. When the pitch is increased, the distance between the bright points in the diffusion distribution is decreased. The distance between the bright points of the defocus image is decreased, and the unnatural defocus phenomenon becomes less conspicuous. An increase in array pitch indicates an increase in size of each individual lens. When the size of this microlens is extremely increased, the microlens itself is observable to a human eye. When the size of the microlens is generally increased, narrow-angled diffusion light is increased. It is, therefore, difficult to perform a focusing operation. This is the problem solved by the first aspect of the present invention (to be described later).

As a technique of manufacturing a focusing screen, there is a method in which a focusing screen master having micropatterned projections on its surface is prepared, a mold is formed from this master, and the micropatterned projections are transferred to the surface of a plastic material.

As also described before, according to the conventional method of manufacturing the focusing screen master, the surface of the master is ground to form micropatterned projections. The focusing screen obtained from the focusing screen master manufactured from this method has an advantage in a natural defocus effect, but has disadvantages in that the frame is dark and the coarse texture is observable due to highly random micropatterned projections on the surface of the focusing screen. In order to eliminate these disadvantages, regular or semi-regular micropatterned projections (appropriate random pattern) may be formed on the surface of the focusing screen, and various methods have been proposed to achieve this. As one of these methods, a mask base having a micropattern is used and comes close to the surface of a photosensitive material applied to the surface of a substrate, and the substrate is exposed to prepare a focusing screen, the surface of which has micropatterned projections corresponding to an exposure amount, as proposed in Japanese Patent Laid-Open Application Nos. 57-148728 and 63-221329. According to this method, a so-called proximity exposure method used in the manufacture of semiconductor devices and the like is directly utilized in the manufacture of focusing screens. A mask 40 having a micropattern 30 formed on a mask base 20 shown in the plan view of FIG. 3 is spaced apart from a substrate 60 applied with a photosensitive material 50 on its surface as shown in the sectional view of FIG. 4 by a distance $\Delta d$ ($\Delta d$ is called proximity), and the photosensitive material 50 is exposed with an exposure beam 70. An illuminance distribution determined by the micropattern 30 of the mask base 20 and the proximity ($\Delta d$) is formed on the surface of the photosensitive material 50. After the photosensitive material 50 is exposed and developed, a micropatterned projection surface of the photosensitive material 50 is formed in correspondence with the illuminance distribution, thereby preparing a focusing screen master.

A focusing screen manufactured from this focusing screen master has a surface of regular or appropriately random micropatterned projections. Therefore, this focusing screen has a sufficiently high brightness level and a finer texture.

Although an array of regular micropatterned projections described in Japanese Patent Laid-Open No. 57-148728 has advantages in that a finer texture can be obtained and the frame is bright, an unnatural defocus phenomenon such as a multi-line defocus phenomenon is caused because the diffusion distribution is an aggregate of bright points 10, as shown in FIG. 5. In Japanese Patent Laid-Open Application No. 63-221329 for providing a random pattern to the array of micropatterned projections so as to solve the unnatural defocus phenomenon, when a weak random pattern is employed, bright points of lower orders become conspicuous. When a strong random pattern, however, is employed, the coarse texture is observable, resulting in inconvenience. These problems are solved by the third aspect of the present invention.

SUMMARY OF THE INVENTION

It is an object of a first aspect of the present invention to provide a focusing screen free from an unnatural defocus phenomenon by decreasing a distance between bright points in a diffusion distribution in accordance with a method different from a method of increasing an array pitch of microlenses.

According to the first aspect of the present invention, there is provided a focusing screen having a large number of microlenses regularly arranged thereon, the improvement wherein heights of the microlenses are n (where n is a natural number of not less than 1) different values, and the microlenses having the same height are cyclically arranged.

A focusing screen (n=3) having the above structure is shown in FIGS. 6 to 8. FIG. 6 shows a two-dimensional microlens array. Differences in heights of three lenses 21, 22, and 23 in FIG. 6 are represented by differences in (color) densities, respectively. Heights h21, h22, and h23 of the microlenses 21, 22, and 23 are defined as follows:

$$h21 = h + \lambda/2 \qquad \text{Eq. 6-1}$$

$$h22 = h \qquad \text{Eq. 6-2}$$

$$h23 = h - \lambda/2 \qquad \text{Eq. 6-3}$$

where h is the reference height, and $\lambda$ is the wavelength of light.

A diffusion distribution of the above focusing screen is two-dimensionally expressed in FIG. 7 and three-dimensionally expressed in FIG. 8. A distribution of bright points 10 can be found in FIG. 7. In comparison with the three-dimensional expression in FIG. 8, FIG. 9 shows a three-dimensional diffusion distribution of a focusing screen obtained by arranging microlenses having the same height. As is apparent from comparison between the three-dimensional diffusion distributions of FIGS. 8 and 9, when the heights of the microlenses vary, the number of bright points in the diffusion distribution is increased, and the intensities of the bright points are decreased.

That is, in the focusing screen according to the first aspect of the present invention, a cyclic pattern different from the cyclic pattern constituted by the same height is formed and has a larger pitch than that of the cyclic pattern constituted by the same height. Therefore, the distance between the bright points in the diffusion distribution becomes small, thus enhancing a more natural defocus effect.

In the focusing screen having n different micropatterned projection heights according to the first aspect of the present invention, the coarse texture is eliminated, the frame is bright, and the natural defocus effect is obtained. However, this focusing screen has much room left to be improved. First, although the natural defocus effect can be obtained for a normal object to be photographed, an unnatural defocus phenomenon occurs in a defocus image of a special object such as a high-brightness point light source. Second, in a single-lens reflex camera, a normal focusing screen has one surface as a diffusion surface and the other surface as a Fresnel lens surface obtained by a large number of concentric saw-toothed projections. At this time, a moiré is formed between the array of microlenses on the diffusion surface and an array of saw-toothed projections on the Fresnel lens surface and becomes conspicuous.

The moiré will be described in detail below. A pitch ratio K is given as follows:

$$K = Pm/Pf$$

where Pm is an array pitch of the microlenses, and Pf is an array pitch of the saw-toothed projections of the Fresnel lens.

FIGS. 10, 11, and 12 illustrate moirés formed when the pitch ratio K is changed. The concentric circles correspond to an array of saw-toothed projections, and straight lines correspond to an array of microlenses. FIG. 10 is the moiré for K=1.0, FIG. 11 is the moiré for K=0.66, and FIG. 12 is the moiré for K=0.55. The moiré becomes conspicuous when a pitch ratio comes close to 1.

A focusing screen having an unnoticeable moiré has the following arrangement. An array pitch p of the microlenses of the focusing screen becomes p=about 20 μm due to the following reasons. When the array pitch p is excessively small, it is difficult to manufacture the microlenses, and the angular array pitch $\theta_p$ (inverse proportion to the pitch p described above) is increased to make bright points more conspicuous. However, when the array pitch p is excessively large, the microlenses themselves are observable. An array pitch of the saw-toothed projections is about Pf=about 40 μm due to the following reasons. When the pitch Pf is excessively small, it is difficult to manufacture the saw-toothed projections. When it is, however, excessively large, the microlenses themselves are observable. Therefore, a pitch ratio K is K=about 0.5 for Pf=p. As is apparent from FIGS. 10, 11, and 12, the moiré is almost noticeable. The unnoticeable moiré in turn constitutes a condition for determining the values of the pitches p and Pf.

The first aspect of the present invention can improve the defocus effect of the focusing screen, but there is additional advantage to be achieved by addressing an influence of the moiré. It is, therefore, an object of the second aspect of the present invention to provide a focusing screen for obtaining a more natural defocus effect by making a bright point distribution of a diffusion distribution more unnoticeable, and for making the moiré more unnoticeable.

According to the second aspect of the present invention, there is provided a focusing screen having a large number of microlenses regularly arranged thereon, the improvement wherein heights of the microlenses are randomly distributed centered on n (n is a natural number of not less than 1) central values, and the microlenses having the same central value are cyclically arranged.

Preferably, a random variation width R falls within the following range:

$$0 < R < 1.5Q/(n-1)$$

where Q is the difference between the maximum and minimum values of the central values.

According to the second aspect of the present invention, as has been described above, in the focusing screen having a large number of microlenses regularly arranged thereon, the heights of the microlenses vary at random centered on the n (n is a natural number of not less than 1) central values, and the microlenses having the same central value are cyclically arranged. Therefore, the unnatural defocus phenomenon can be further improved, and the moiré formed with the Fresnel lens can be further unnoticeable.

It is an object according to the third aspect of the present invention to provide a method of manufacturing a focusing screen having a more natural defocus effect and almost free from a moiré formed with the Fresnel lens.

According to the third aspect of the invention, there is provided a method of manufacturing a focusing screen, comprising the steps of:

bringing a mask base having a plurality of micropatterns to come close to a surface of a photosensitive material applied to a substrate; and exposing the photosensitive material through a mask and forming micropatterned projections corresponding to the micropatterns on the surface of the photosensitive material, wherein dimensions of the micropatterns take n different values, and the micropatterns having the same dimension are cyclically arranged.

The focusing screen manufactured by this method has an increase in the number of bright points so as to make the bright points unnoticeable, i.e., make the unnatural defocus phenomenon more natural.

A modification of the third aspect of the present invention provides the following: a method of manufacturing a focusing screen, comprising the steps of:

bringing a mask base having a plurality of micropatterns to come close to a surface of a photosensitive material applied to a substrate; and exposing the photosensitive material through a mask and forming micropatterned projections corresponding to the micropatterns on the surface of the photosensitive material, wherein dimensions of the micropatterns vary centered on n different central values, the micropatterns having the same central value are cyclically arranged, and a width Q of variations is defined by:

$$Q < (a-b)/(n-1)$$

where a is the maximum value of the central values, b is the minimum value of the central values, and n is the number of magnitudes of the central values.

In the focusing screen manufactured by this modification, the bright point are further unnoticeable, and the moiré is further unnoticeable in interaction with the Fresnel lens.

In the above two methods, a substrate having micropatterned projections on its surface may be used. In this case, the bright points and the moire are further unnoticeable.

BRIEF DESCRIPTION OF THE DRAWINGS

FIGS. 13A, 13B, and 13C are views for explaining an embodiment of the focusing screen of the first aspect of the present invention, in which FIG. 13A is a view showing a microlens array, FIG. 13B is a sectional view thereof along the x-axis, and FIG. 13C is a view showing a bright point array of the diffusion distribution;

FIGS. 14A, 14B, and 14C are views for explaining another embodiment of the focusing screen of the first aspect of the present invention, in which FIG. 14A is a view showing a microlens array, FIG. 14B is a sectional view thereof along the x-axis, and FIG. 14C is a view showing a bright point array of the diffusion distribution;

FIGS. 15A, 15B, and 15C are views for explaining still another embodiment of the focusing screen of the first aspect of the present invention, in which FIG. 15A is a view showing a microlens array, FIG. 15B is a sectional view thereof along the x-axis, and FIG. 15C is a view showing a bright point array of the diffusion distribution;

FIGS. 16A, 16B, and 16C are views for explaining still another embodiment of the focusing screen of the first aspect of the present invention, in which FIG. 16A is a view showing a microlens array, FIG. 16B is a sectional view thereof along the x-axis, and FIG. 16C is a view showing a bright point array of the diffusion distribution;

FIGS. 17A, 17B, and 17C are views for explaining still another embodiment of the focusing screen of the first aspect of the present invention, in which FIG. 17A is a view showing a microlens array, FIG. 17B is a sectional view thereof along the x-axis, and FIG. 17C is a view showing a bright point array of the diffusion distribution;

DETAILED DESCRIPTION OF THE PREFERRED EMBODIMENTS

Embodiments of the first aspect of the present invention will be described below.

FIGS. 13A, 13B, and 13C are views for explaining an arrangement of an embodiment of a focusing screen according to the first aspect of the present invention. This embodiment exemplifies microlenses having two different heights (n=2). FIG. 13A shows the same coordinate system as that of FIG. 1A, and differences in densities of the colors of the microlenses represent different heights, respectively. Referring to FIG. 13A, two types of microlenses $2a$ and $2b$ having heights ha and hb (ha>hb) are cyclically arranged on the surface of a focusing screen 1A. The two different heights are defined as follows:

$$ha = h + \lambda/4 \quad \text{Eq. 7-1}$$
$$hb = h - \lambda/4 \quad \text{Eq. 7-2}$$

A central position $(x_a, y_a)$ of the microlens $2a$ having the height ha is defined as follows:

$$x_a = p1 \times (i+j/2) \quad \text{Eq. 8-1}$$
$$y_a = p2 \times (j \times \sqrt{3}/2) \quad \text{Eq. 8-2}$$

A central position $(x_b, y_b)$ of the microlens $2b$ having the height hb is defined as follows:

$$x_b = p1 \times (i + 0.5 + j/2) \quad \text{Eq. 8-3}$$
$$y_b = p2 \times (j \times \sqrt{3}/2) \quad \text{Eq. 8-4}$$

The section of the microlens along the x-axis is shown in FIG. 13B. This cycle is apparently different from that of the same height. This new cycle forms a bright point array of a diffusion distribution shown in FIG. 13C. FIG. 13C employs the same coordinate system as that of FIG. 1C. Angular coordinate values $(\theta_x, \theta_y)$ of the central bright point are defined as follows:

$$\theta_x = \theta_{p1} \times (i/\sqrt{3} + j \times \sqrt{3}) \quad \text{Eq. 9-1}$$
$$\theta_y = \theta_{p2} \times (-i+j) \quad \text{Eq. 9-2}$$

Figure 1A:
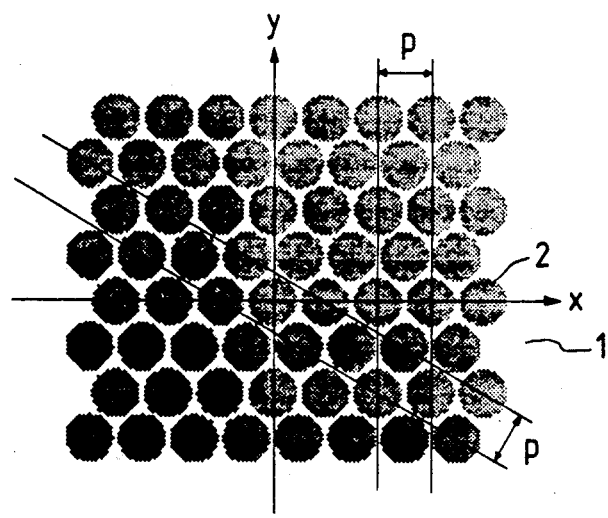
FIGS. 1A, 1B, and 1C are views for explaining an arrangement of a conventional focusing screen.
Figure 1B:
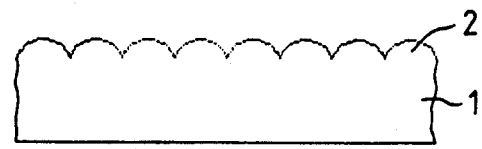
Figure 1C:
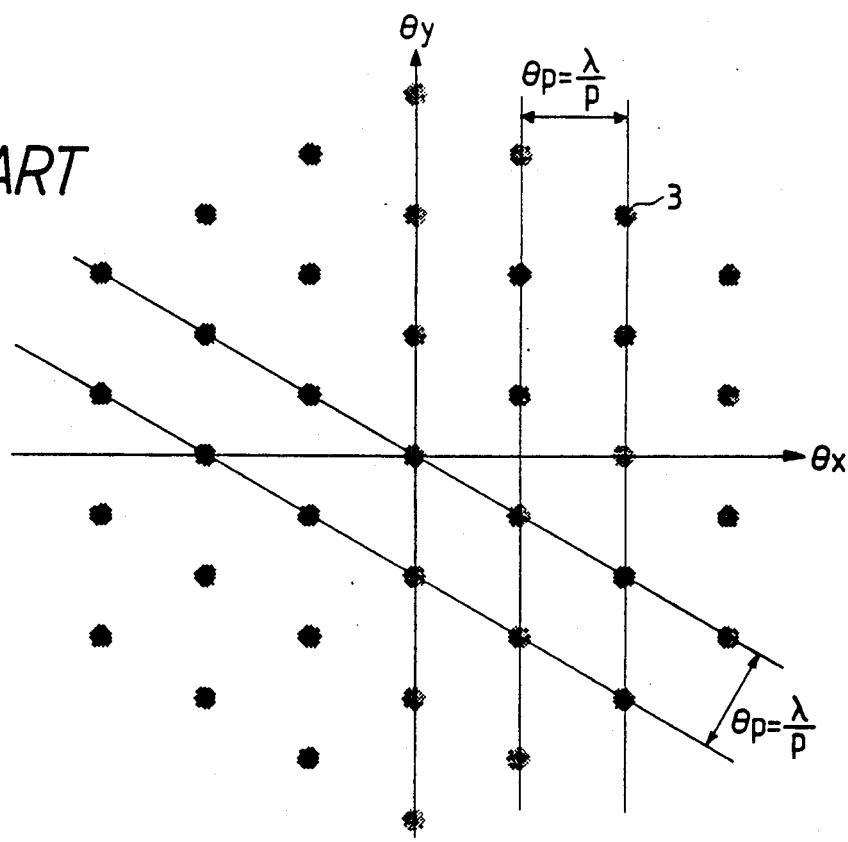
Figure 2A:
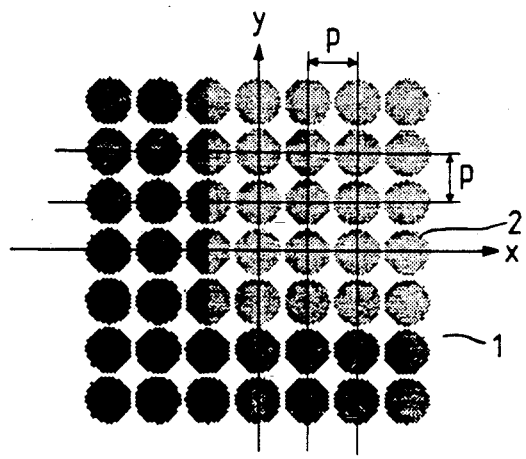
FIGS. 2A, 2B, and 2C are views for explaining an arrangement of another conventional focusing screen.
Figure 2B:
Figure 2C:
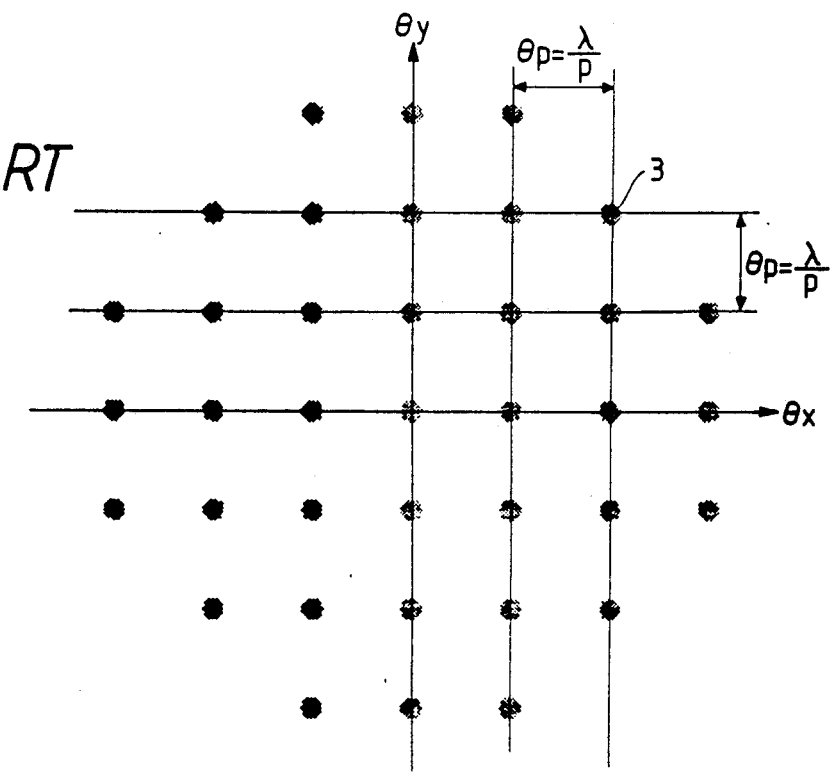
Figure 14A:
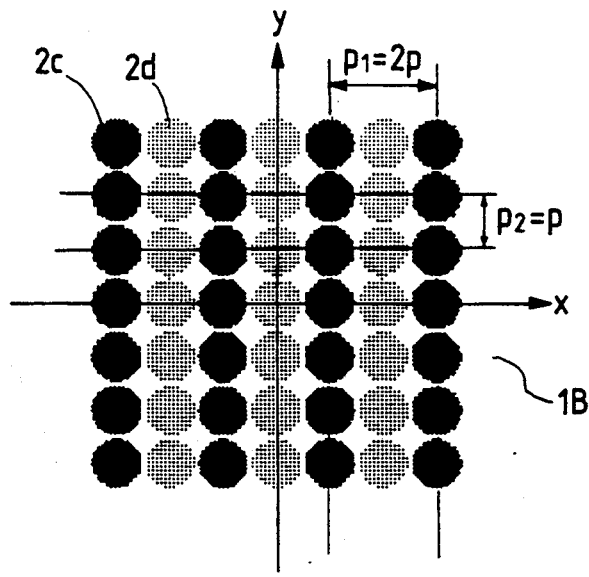
Figure 14B:
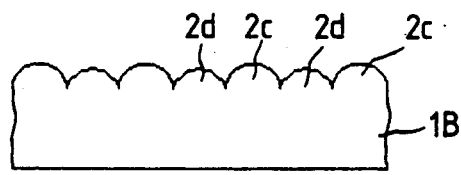
Figure 14C:
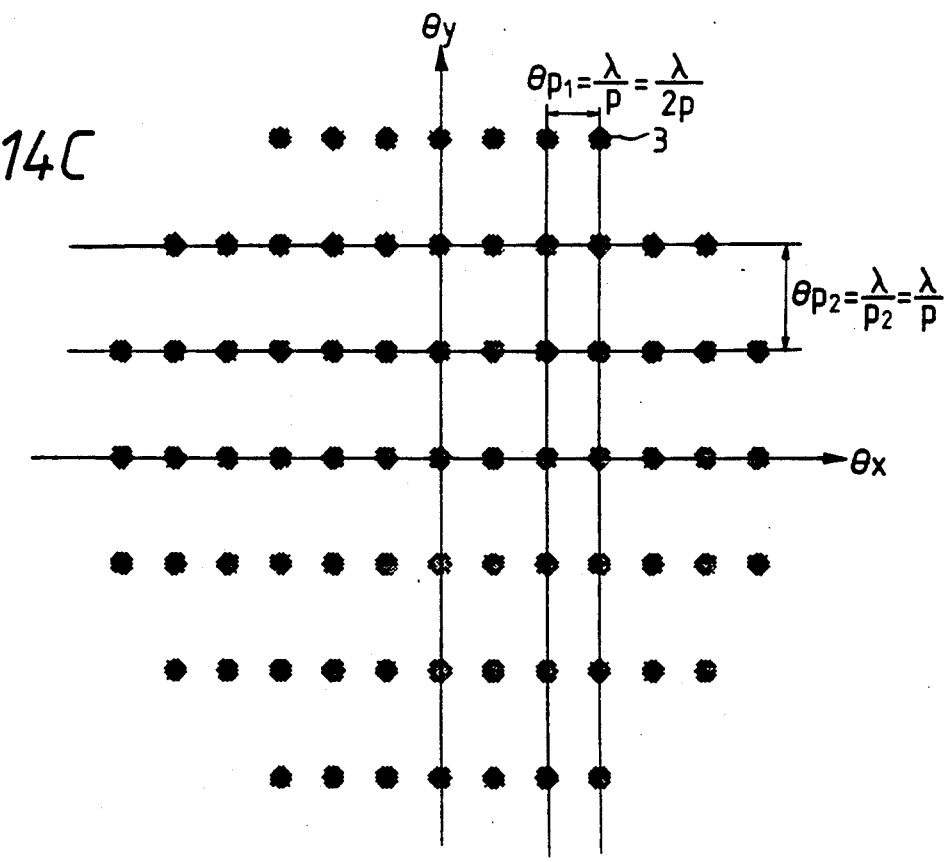

The angular pitch in the 60° direction is smaller than that of the same height. Another embodiment having an arrangement different from that of the above embodiment by using two different heights is shown in FIGS. 14A, 14B, and 14C. The relationships of FIGS. 14A, 14B, and 14C with FIGS. 1A, 1B, and 1C are the same as in FIGS. 13A, 13B, and 13C. Referring to FIGS. 14A, 14B, and 14C, two different types of microlenses $2c$ and $2d$ having different heights hc and hd (hc>hd) are cyclically arranged. These two different heights are defined as follows:

$$hc = h + \lambda/2 \quad \text{Eq. 10-1}$$
$$hd = h \quad \text{Eq. 10-2}$$

FIGS. 15A, 15B, and 15C are views for explaining an arrangement of still another embodiment of the focusing screen according to the first aspect of the present invention. This embodiment exemplifies three different heights (n=3). The relationships of FIGS. 15A, 15B, and 15C with FIGS. 1A, 1B, and 1C are the same as in FIGS. 13A, 13B, and 13C. Referring to FIGS. 15A, 15B, and 15C, three different types of microlenses $2e$, $2f$, and $2g$ having different heights he, hf, and hg (he>hf, and hf>hg) are cyclically arranged. These three different heights are defined as follows:

$$he = h + \lambda/2 \quad \text{Eq. 11-1}$$
$$hf = h \quad \text{Eq. 11-2}$$
$$hg = h - \lambda/2 \quad \text{Eq. 11-3}$$

Figure 16A:
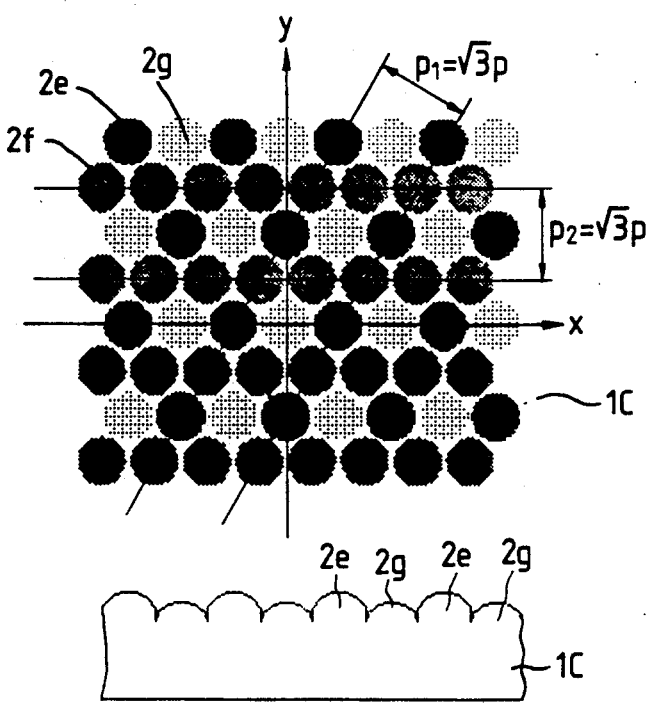
Figure 16B:
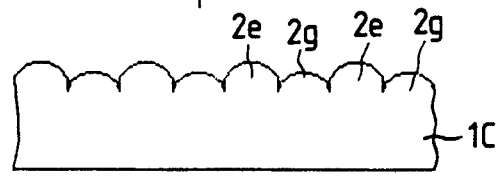
Figure 16C:
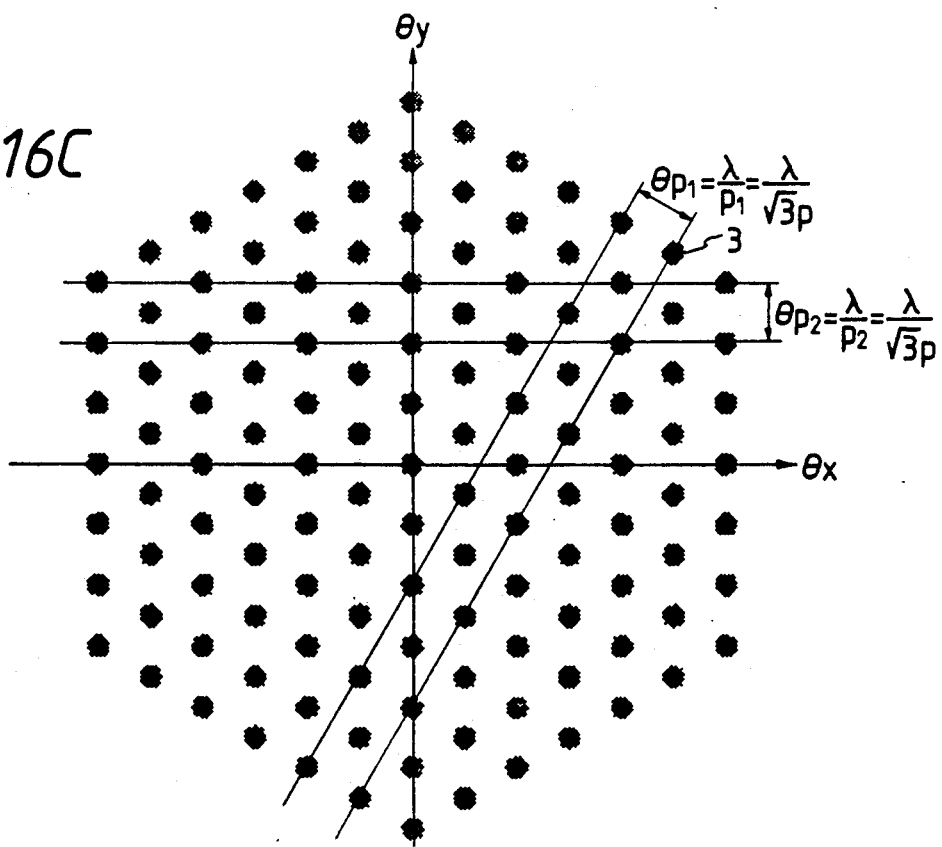
Figure 17A:
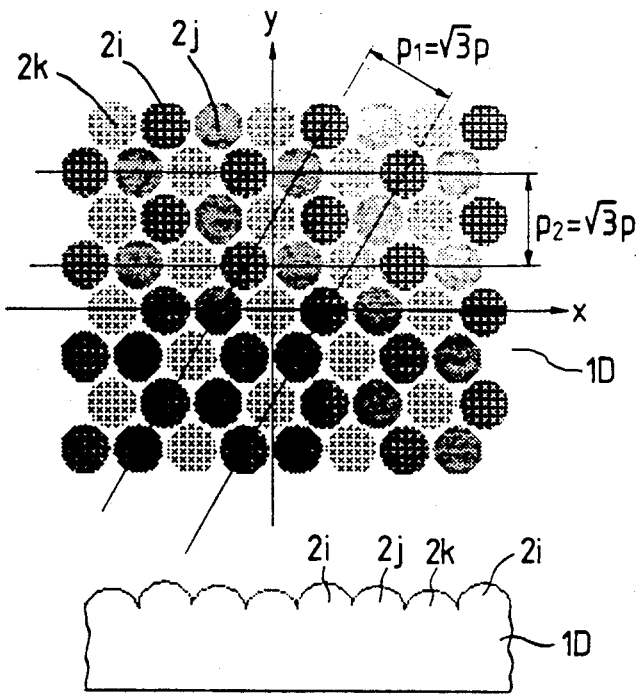
Figure 17B:
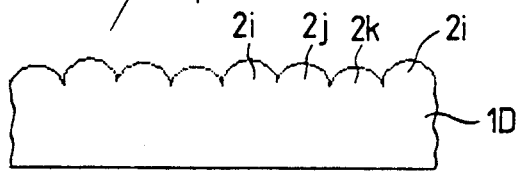
Figure 17C:
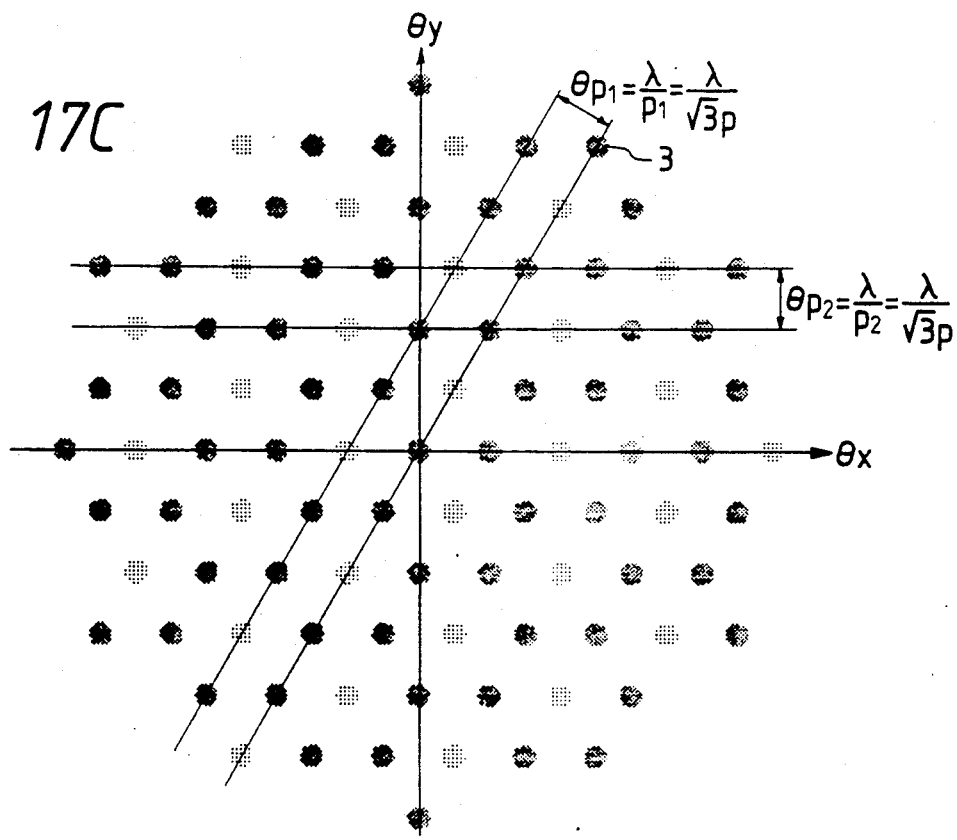

Still another embodiment having the above three different heights but an arrangement different from that of the above embodiment is shown in FIGS. 16A, 16B, and 16C. Still another embodiment having three heights different from those of the above embodiment and an arrangement different from that of the above embodiment is shown in FIGS. 17A, 17B, and 17C. Three different types of microlenses $2i$, $2j$, and $2k$ having three different heights hi, hj, and hk (hj>hj, and hj>hk) are defined as follows:

$$hi = h + \lambda/3 \quad \text{Eq. 12-1}$$
$$hj = h \quad \text{Eq. 12-2}$$
$$hk = h - \lambda/3 \quad \text{Eq. 12-3}$$

The arrangement formula of the microlenses having three different heights is omitted. However, as is apparent from FIGS. 15A, 15B, and 15C and FIGS. 16A, 16B, and 16C, new cycles different from the cycle of the same height can be obtained. As is also apparent from each of FIGS. 15C, 16C, and 17C, the angular pitch of the bright point array of the diffusion distribution is decreased due to this new cycle of the microlenses. Referring to FIG. 17C, differences in density of the bright points indicate differences in brightness of the bright points. A higher density corresponds a brighter point.

The focusing screens for n=2 and n=3 are exemplary. When the number n is increased, the angular pitch of the bright point array of the diffusion distribution can be similarly decreased. That is, when the number n is large, the cycle of the microlenses is diversified. However, in order to reflect diversity on the bright point array of the diffusion distribution, differences between the n heights must be large. When these differences, however, are excessively large, the coarse texture tends to be observable. In practice, the number n preferably falls within the range of 4 or less.

The sectional structures of the microlenses are shown in FIGS. 13B, 14B, 15B, 16B, and 17B to illustrate different heights of the microlenses. In this case, the heights of the microlenses are illustrated for descriptive convenience, and the shapes of the microlenses are not limited to the ones illustrated in these drawings.

In the above embodiments, the microlenses have the different heights but the same shape. However, even if the shapes of the microlenses are slightly different from each other, the same effects as in the above embodiments can be obtained.

Embodiments of the second aspect of the present invention will be described below.

Figure 6:
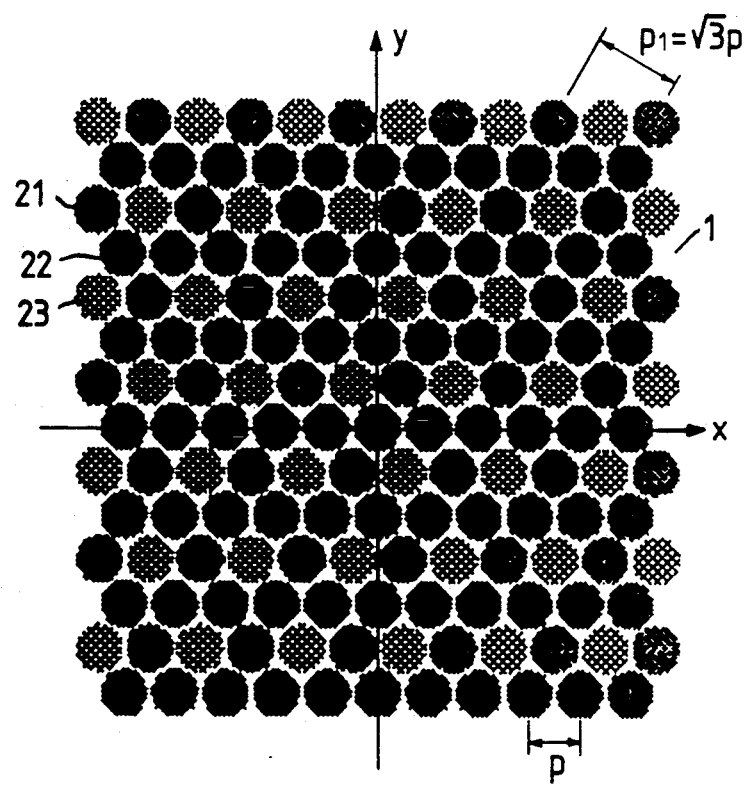
FIG. 6 is a view showing a microlens array for explaining an arrangement of a focusing screen having n different heights according to the first aspect of the present invention.
Figure 7:
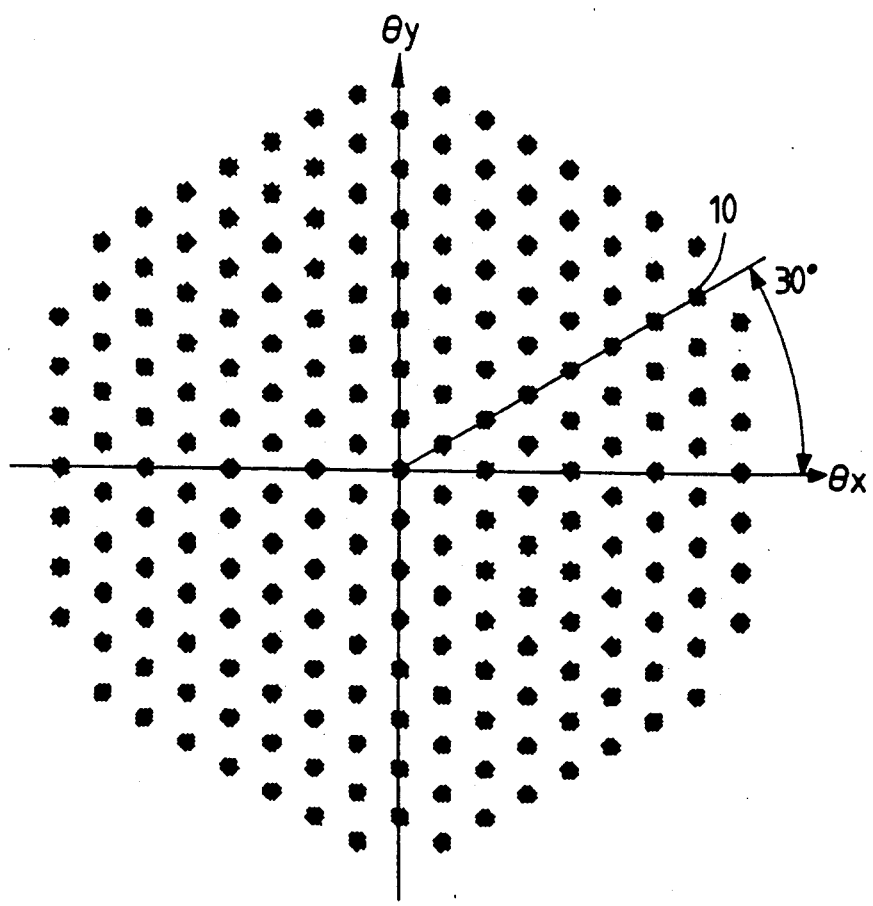
FIG. 7 is a view showing a two-dimensional bright point array of a diffusion distribution of the focusing screen shown in FIG. 6.
Figure 18:
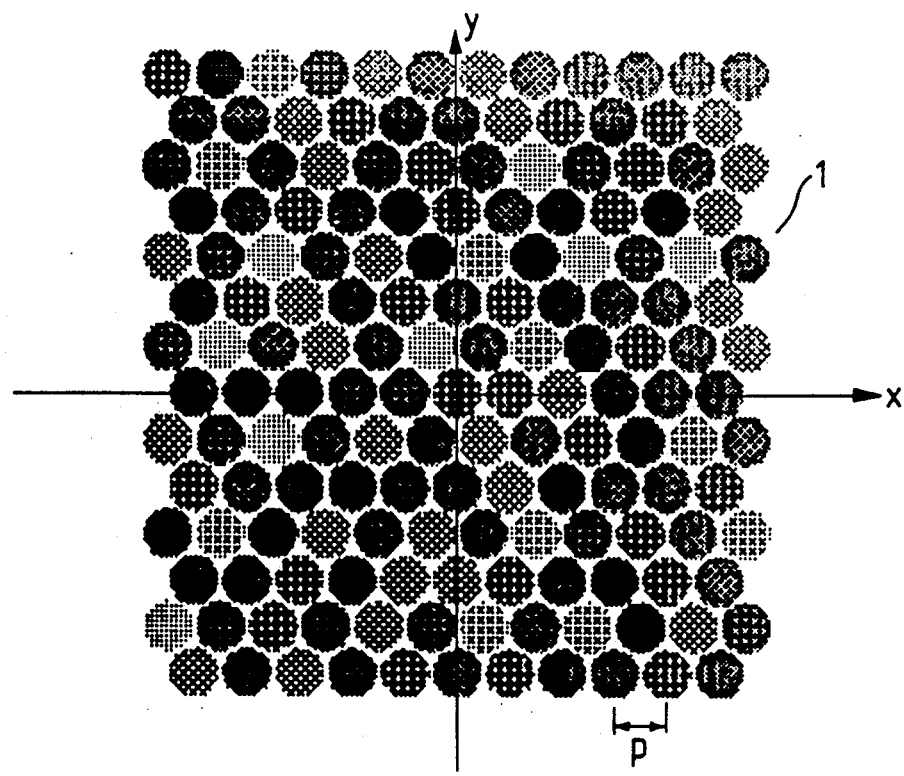
FIG. 18 is a view showing a microlens array to explain an embodiment of the focusing screen according to the second aspect of the present invention.
Figure 19:
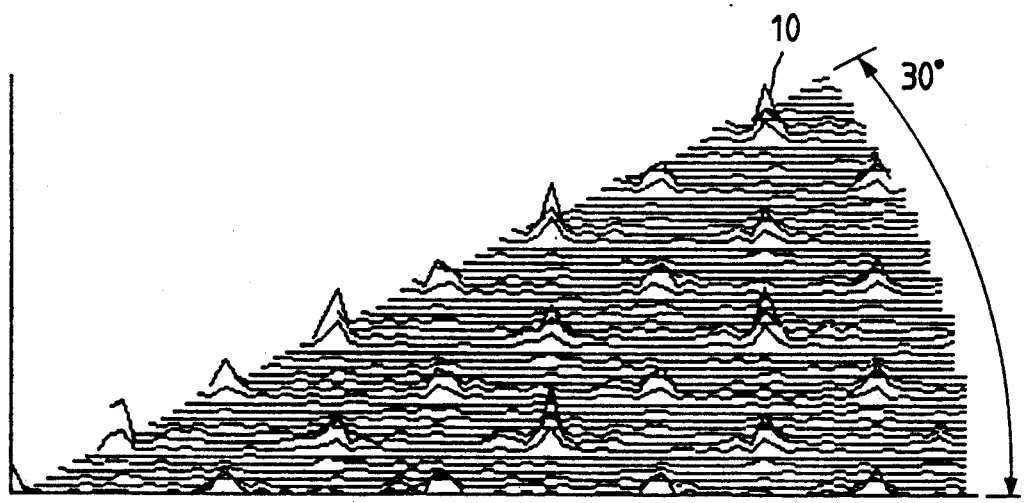
FIG. 19 is a view showing a three-dimensional diffusion distribution of the focusing screen shown in FIG. 18.

FIGS. 18 and 19 are the views for explaining an embodiment of a focusing screen according to the second aspect of the present invention. This focusing screen has three different central values (n=3) of heights and has a random pattern having n different heights in an arrangement (FIG. 6) described in the "Summary of the Invention". Three different central values h11, h12, and h13 of the heights are defined as follows:

$$h11 = h + \lambda/2 \qquad \text{Eq. 13-1}$$

$$h12 = h \qquad \text{Eq. 13-2}$$

$$h13 = h - \lambda/2 \qquad \text{Eq. 13-3}$$

FIG. 18 is a plan view of microlenses, showing differences in heights by differences in (color) patterns. A random height pattern is apparently provided, as compared with FIG. 6. A substantial arrangement cycle which emphasizes a moiré described with reference to the moiré patterns is not conspicuous. According to this embodiment, the moiré pattern is more unnoticeable.

Figure 8:
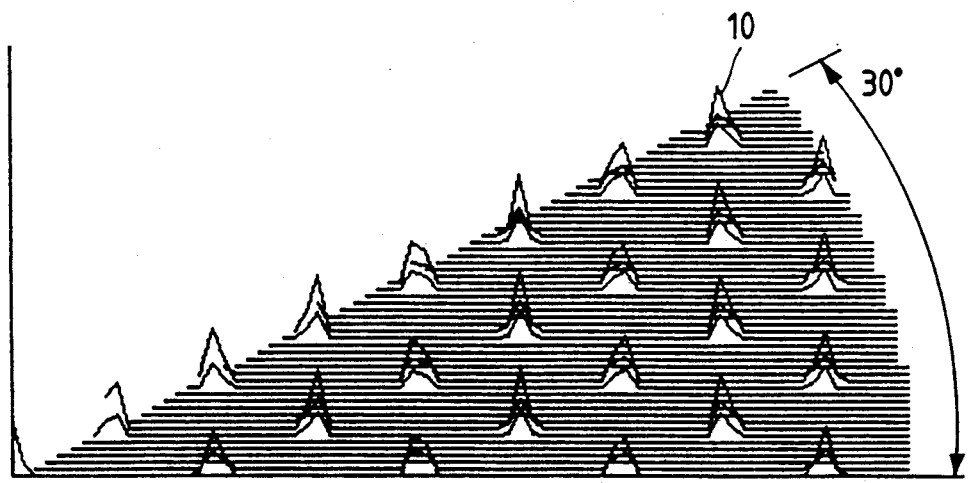
FIG. 8 is a view showing a three-dimensional bright point array of the diffusion distribution of the focusing screen shown in FIG. 6.
Figure 9:
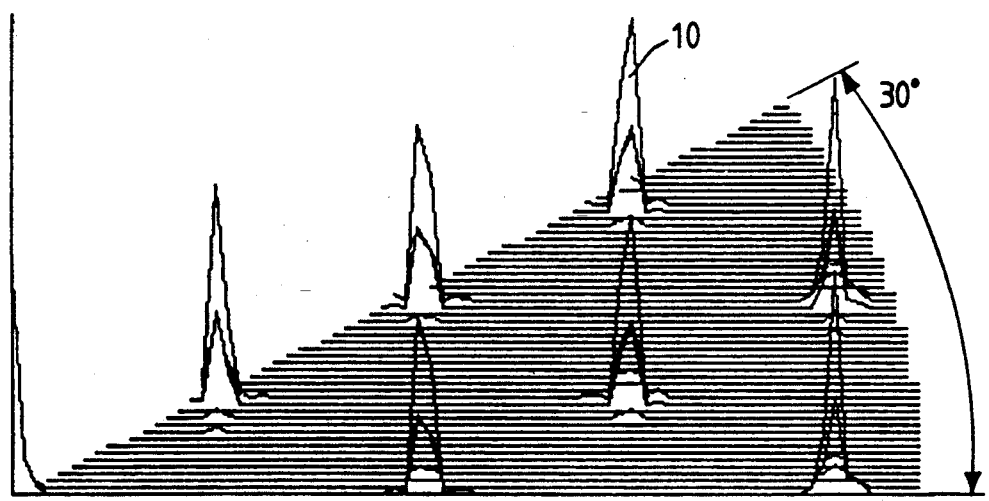
FIG. 9 is a view showing a three-dimensional bright point distribution of a diffusion distribution of a conventional focusing screen on which microlenses having the same height are cyclically arranged.
Figure 10:
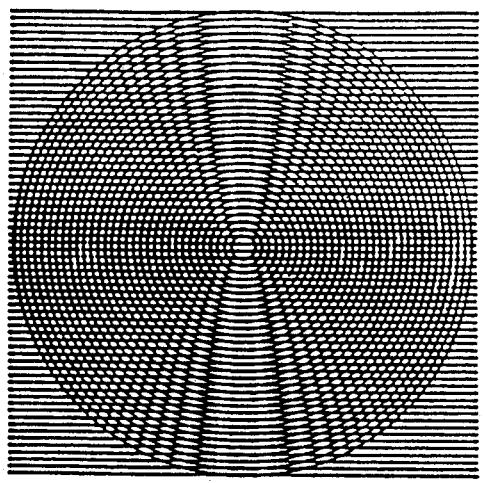
FIGS. 10, 11, and 12 are views showing the principles of moirés.
Figure 11:
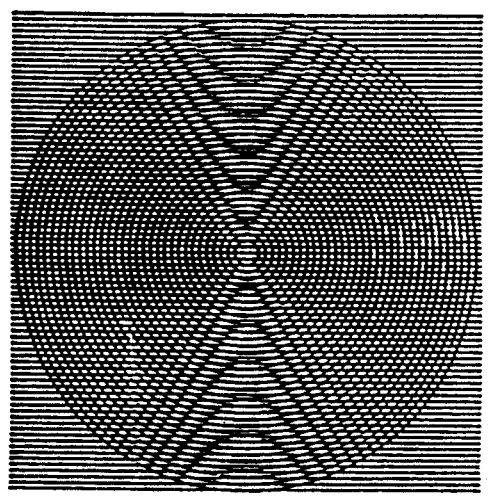
Figure 12:
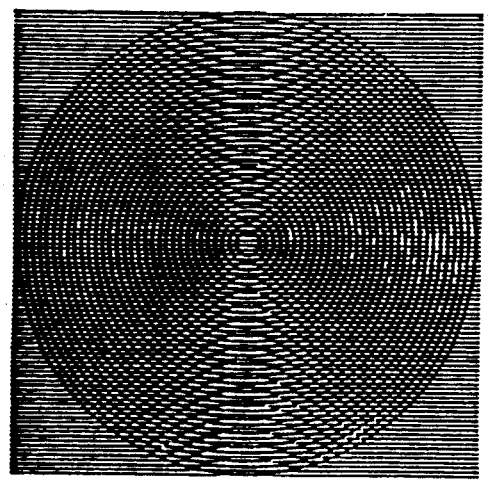

The diffusion distribution of this embodiment is shown in FIG. 19. FIG. 19 shows a distribution which is substantially the same as that of FIG. 8. When the diffusion distributions of FIGS. 19 and 8 are compared with each other, they have the same number of bright points. In the distribution of FIG. 19, light diffused between the bright points is present, and therefore the intensities of the bright points are decreased. According to this embodiment, therefore, the bright points are more unnoticeable.

The width R of the random pattern in FIGS. 18 and 19 is set to be R=0.4λ. When an arbitrary microlens of the microlenses in FIG. 8 has a height H, a microlens height Hr (FIG. 18) corresponding thereto is defined as follows:

$$Hr = H + R \times rand \qquad \text{Eq. 14}$$

where rand is a random variable in the range of −1 to 1.

The width R of the random number is defined as follows:

$$0 < R < 1.5 \times Q/(n-1) \qquad \text{Inequality 15}$$

Figure 20:
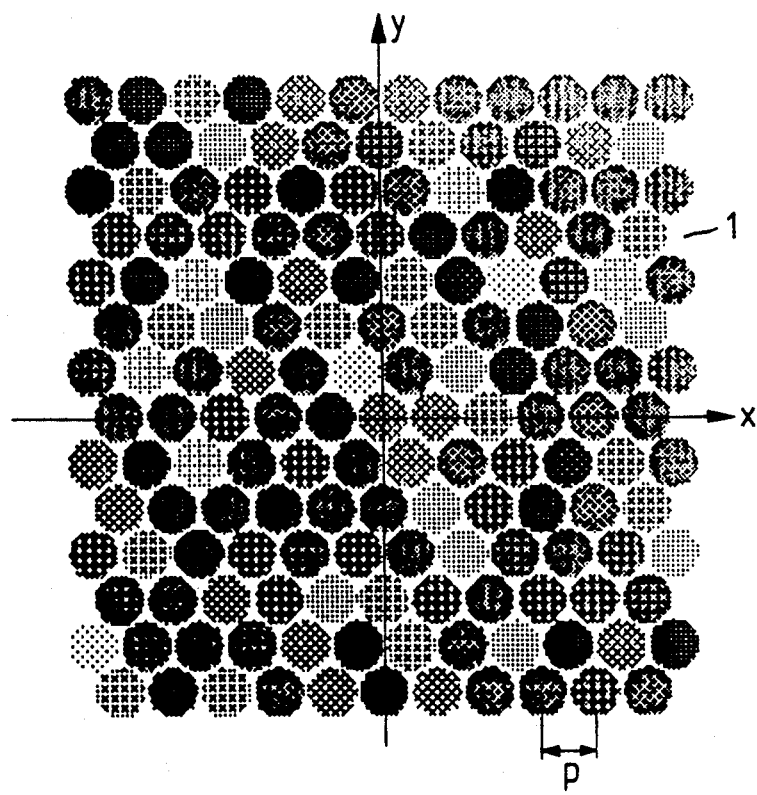
FIG. 20 is a view showing a microlens array to explain an arrangement of a focusing screen having an emphasized random pattern of the focusing screen shown in FIG. 18.
Figure 21:
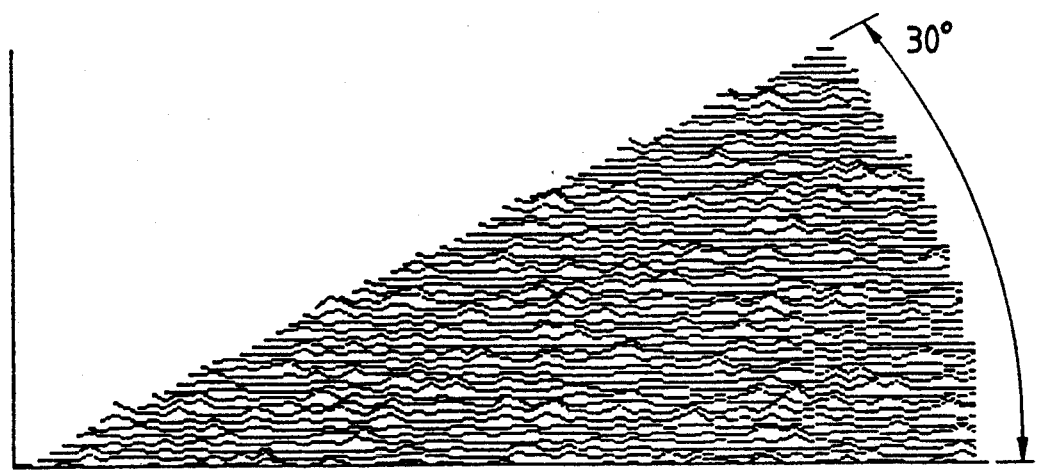
FIG. 21 is a view showing a three-dimensional diffusion distribution of the focusing screen shown in FIG. 20.

This is based on the first aspect of the present invention wherein, of the microlenses having n different heights, the microlenses having the same height are cyclically arranged to increase the number of bright points of the diffusion distribution, thereby making the bright points unnoticeable. When the coarse texture width R falls outside the range of Inequality 15, there tends not to provide an effect of increasing the number of bright points. As described with reference to the conventional arrangement of the ground focusing screen, when the large random pattern is used, the coarse texture tends to be observable. This drawback can be eliminated by Inequality 15. In practice, an arrangement having an increased random width as R=0.8λ under the same conditions as those of FIGS. 18 and 19 is shown in FIGS. 20 and 21. As is apparent from FIG. 21, when this emphasized random pattern is used, it is apparent that the bright points of the diffusion distribution almost disappear. Although not illustrated, the coarse texture is conspicuously observable. In the arrangements of FIGS. 18 and 19 and FIGS. 20 and 21, substitutions of n = 3, Q = h11 − h13 = λ into Inequality 15 yield the following:

$$R < 0.75\lambda \qquad \text{Inequality 16}$$

In the arrangement of FIGS. 18 and 19, the value of R=0.4λ falls within the prescribed range. In the arrangement of FIGS. 20 and 21, however, the value of R=0.8λ falls outside the prescribed range.

Figure 22:
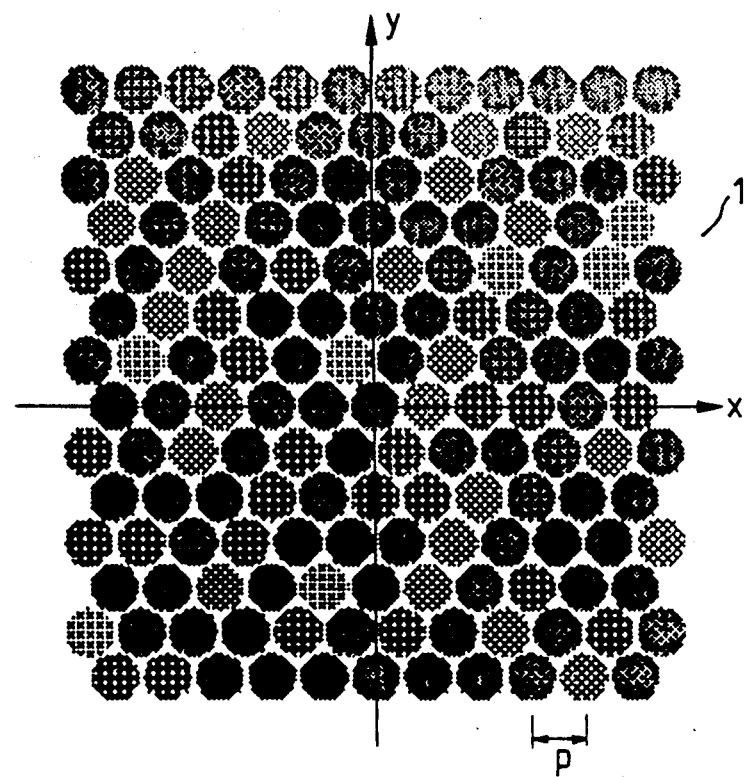
FIG. 22 is a view showing a microlens array to explain an arrangement of another embodiment of the focusing screen according to the second aspect of the present invention.
Figure 23:
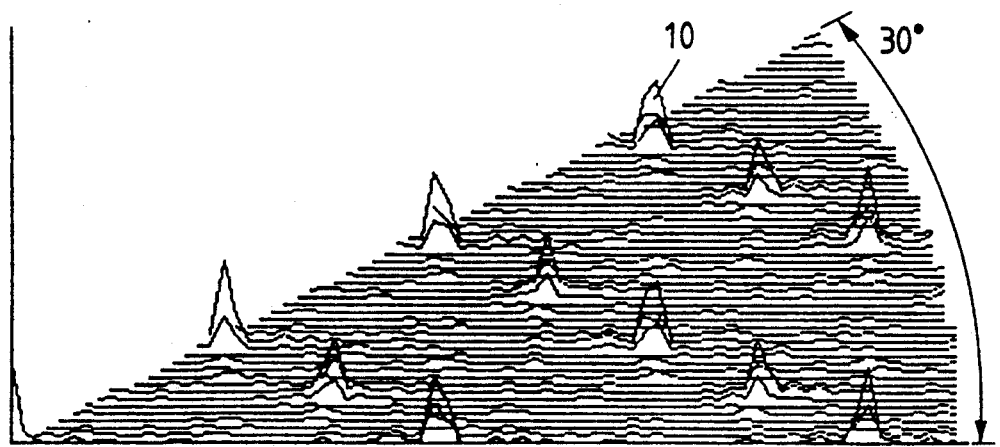
FIG. 23 is a view showing a three-dimensional diffusion distribution of the focusing screen shown in FIG. 22.
Figure 24:
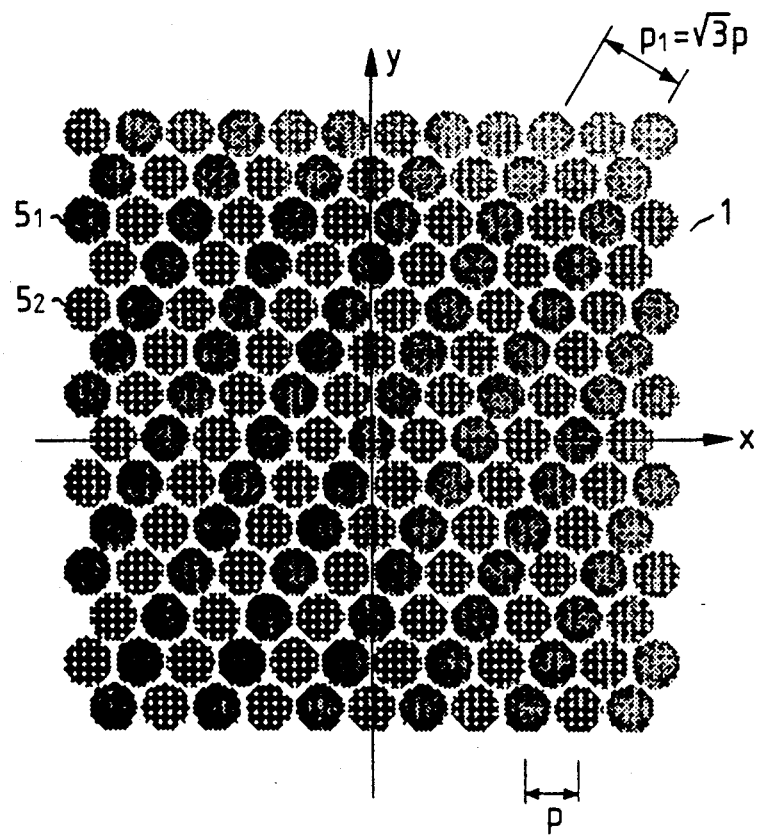
FIG. 24 is a view showing a microlens array to explain an arrangement of a focusing screen having n different heights by giving a random pattern to the heights although this focusing screen has the same microlens array as that of FIG. 22.
Figure 25:
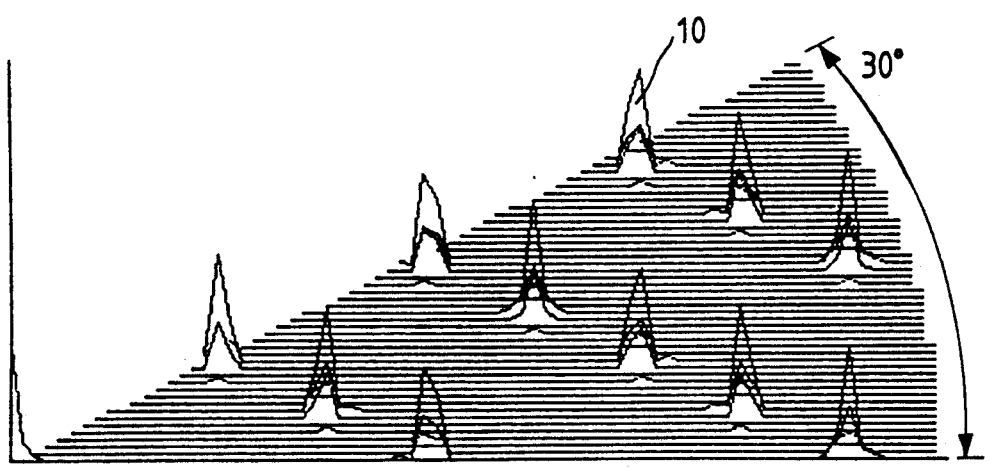
FIG. 25 is a view showing a three-dimensional diffusion distribution of the focusing screen shown in FIG. 24.

FIGS. 22 and 23 are views for explaining an arrangement of another embodiment of the focusing screen according to the present invention. In this case, two different central values (n=2) are defined as follows:

$$h41 = h + \lambda/4 \qquad \text{Eq. 17-1}$$

$$h42 = h - \lambda/4 \qquad \text{Eq. 17-2}$$

therefore, Q=h41−h42=λ/2, and the random width R falls within the range of R<0.75. In this case, R=0.4λ. In a focusing screen having microlenses of the following two different heights, as shown in FIGS. 24 and 25:

$$h51 = h + \lambda/4 \qquad \text{Eq. 18-1}$$

$$h52 = h - \lambda/4 \qquad \text{Eq. 18-2}$$

the random height is given to the microlenses within the above range of the width R. The same effect as described above can be obtained upon comparison between FIGS. 22 and 23 and FIGS. 24 and 25.

Figure 26:
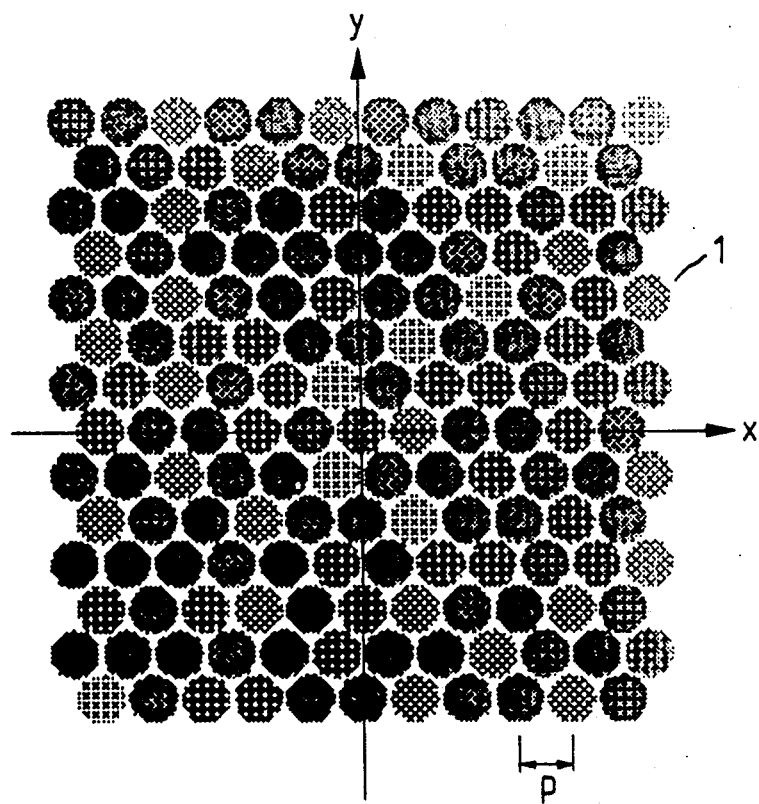
FIG. 26 is a view showing a microlens array to explain an arrangement of another embodiment of the focusing screen according to the second aspect of the present invention.
Figure 27:
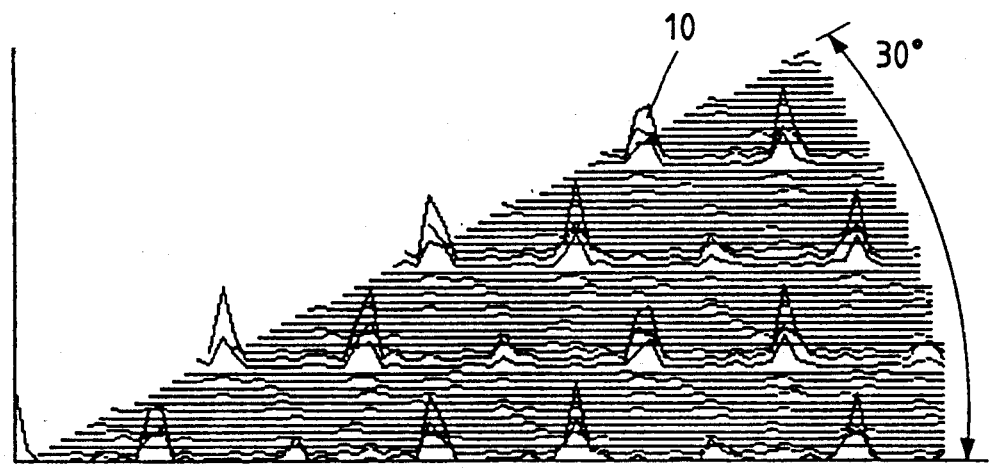
FIG. 27 is a view showing a three-dimensional diffusion distribution of the focusing screen shown in FIG. 26.
Figure 28:
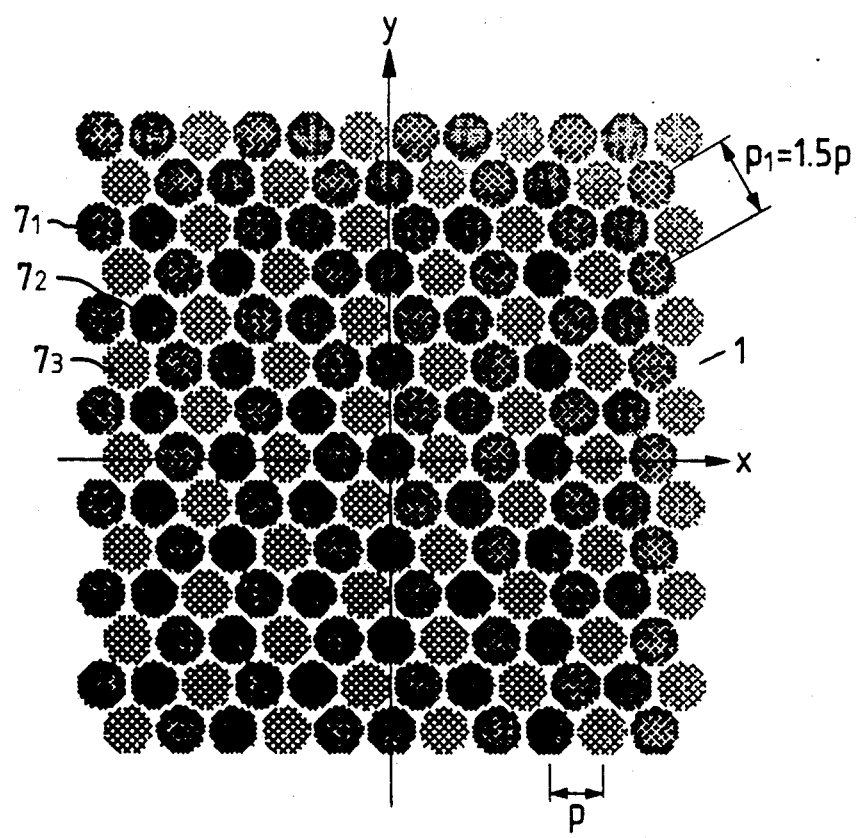
FIG. 28 is a view showing a microlens array to explain an arrangement of a focusing screen having n different heights without any random pattern in heights although this focusing screen has the same microlens array as that of FIG. 26.

FIGS. 26 and 27 are views for explaining an arrangement according to still another embodiment of the focusing screen of the present invention. In this case, three different central values (n=3) of heights are the same as those of FIGS. 18 and 19, but a different arrangement is provided. These three different central values are defined as follows:

$$h61 = h + \lambda/3 \qquad \text{Eq. 19-1}$$

$$h62 = h \qquad \text{Eq. 19-2}$$

$$h63 = h - \lambda/3 \qquad \text{Eq. 19-3}$$

therefore, Q=h61−h63=2λ/3, and the random width R is defined as R<λ/2. In this arrangement, R=0.3λ. In the focusing screen having the microlenses of the following three heights in FIGS. 28 and 29:

$$h71 = h + \lambda/3 \qquad \text{Eq. 20-1}$$

$$h72 = h \qquad \text{Eq. 20-2}$$

$$h73 = h - \lambda/3 \qquad \text{Eq. 20-3}$$

the random height is given to the microlenses within the range of the width R. The same effect as described above is obtained upon comparison between FIGS. 26 and 27 and FIGS. 28 and 29.

Embodiments of the third aspect of the present invention will be described below.

Figure 29:
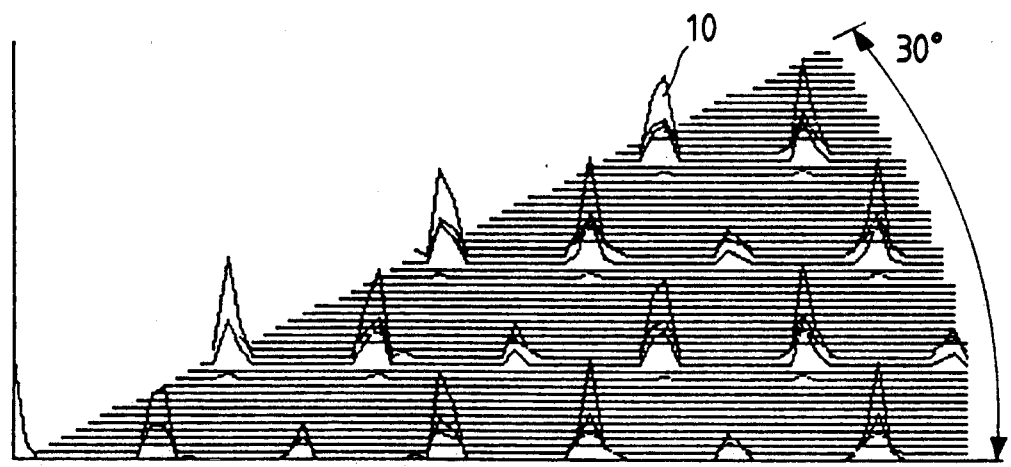
FIG. 29 is a view showing a three-dimensional diffusion distribution of the focusing screen shown in FIG. 28.
Figure 30:
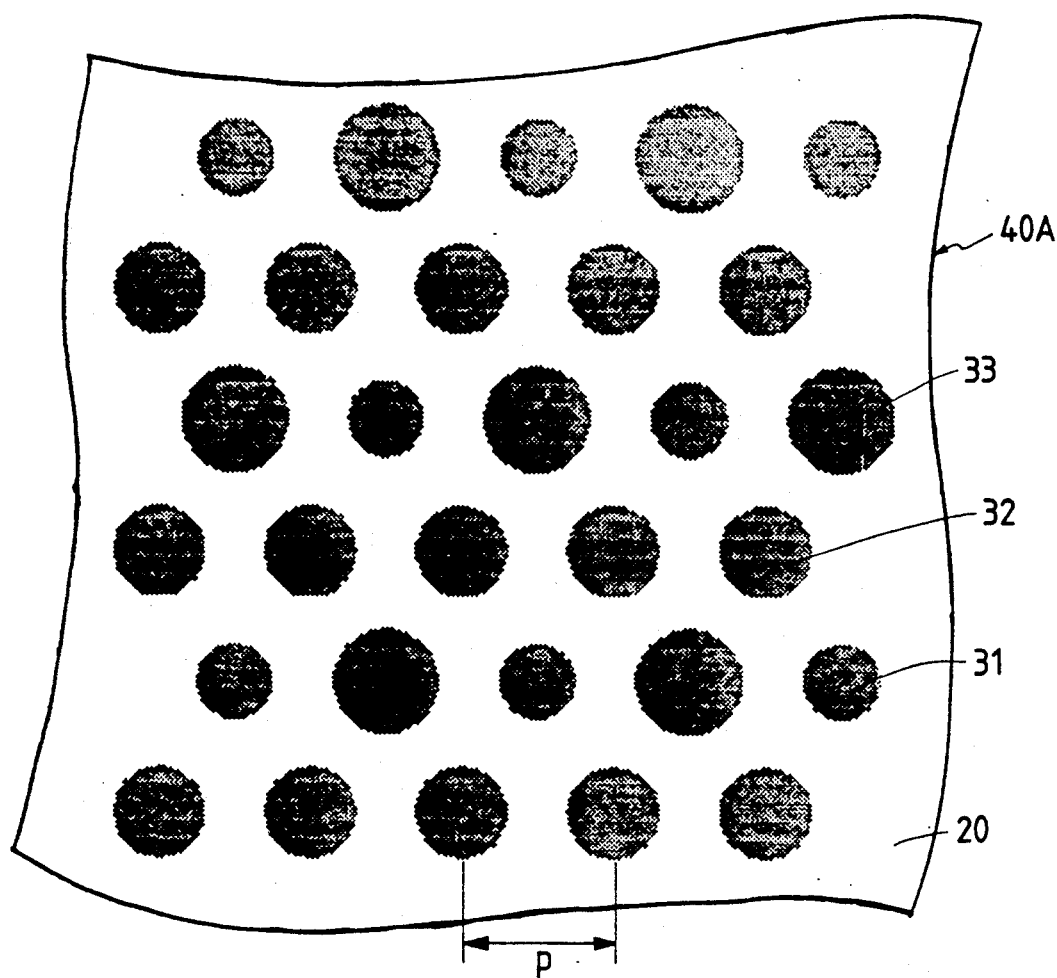
FIG. 30 is a view showing an arrangement of a mask used in an embodiment of a method of manufacturing the focusing screen according to the third aspect of the present invention.

FIG. 30 is a plan view showing an arrangement of a mask for explaining an embodiment of a method of manufacturing a focusing screen according to the present invention. The lenses have three different dimensions (n=3). Referring to FIGS. 29 and 30, a mask 40A having three different types of micropatterns 31, 32, and 33 having different dimensions $r_1$, $r_2$, and $r_3$ ($r_1 < r_2 < r_3$)

is formed on the surface of a mask base 20. These three dimensions are defined as follows:

$$r_1 = r_0 - \Delta r$$

$$r_2 = r_0$$

$$r_3 = r_0 + \Delta r$$

where $\Delta r$ satisfies $0 < \Delta r < (p - r_0)$ and p is an arrangement cycle of the micropatterns.

Figure 3:
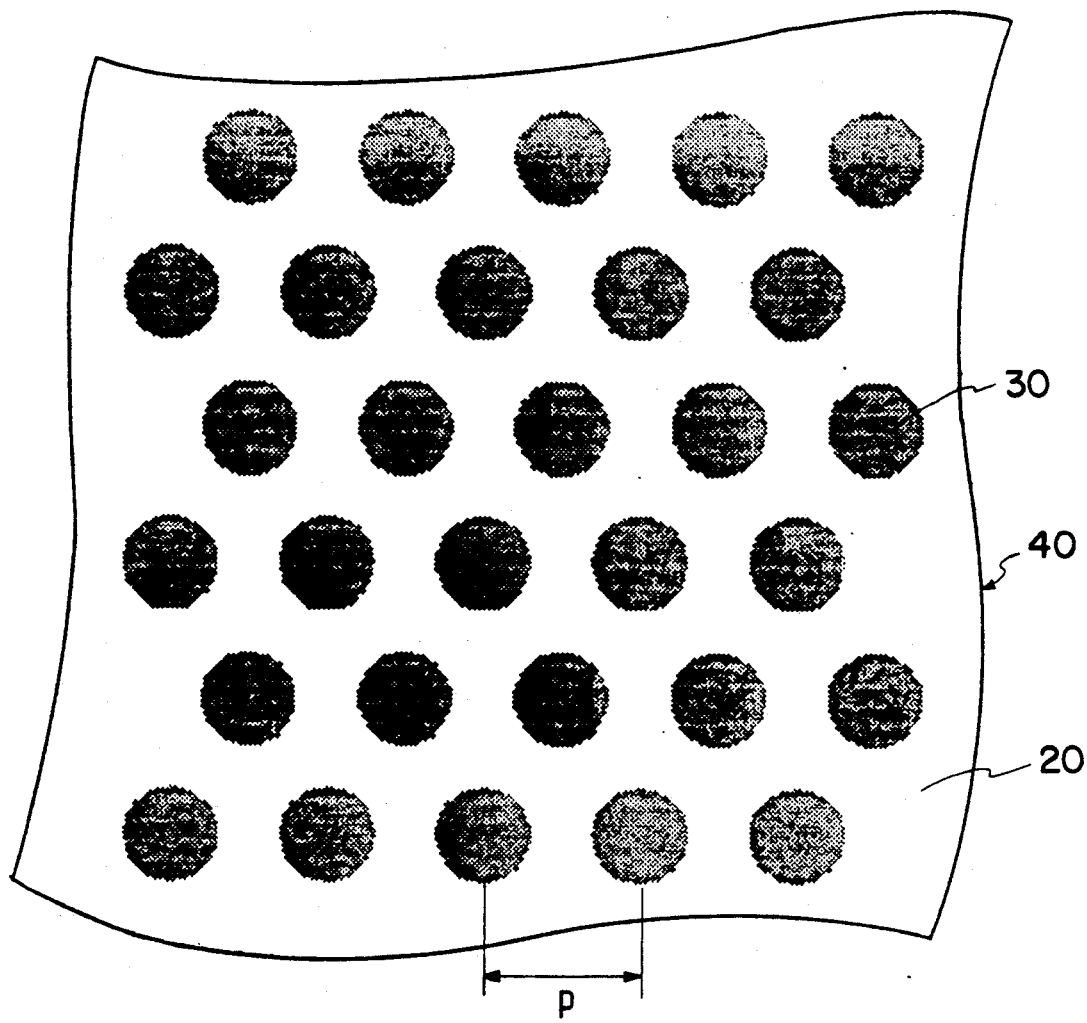
FIG. 3 is a view for explaining an arrangement of a conventional mask.
Figure 5:
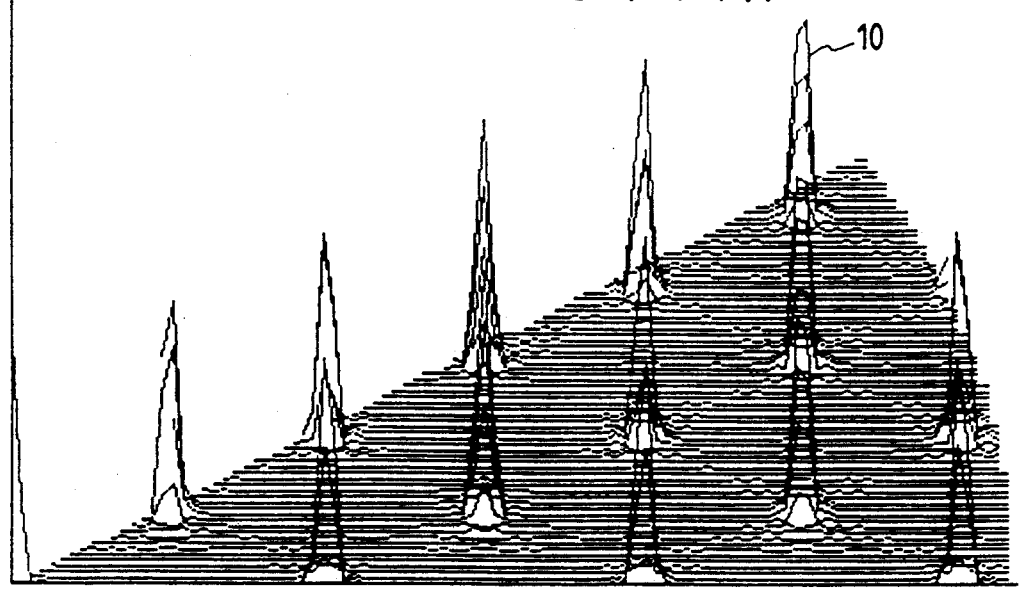
FIG. 5 is a view showing three-dimensional diffusion characteristics of a focusing screen manufactured by the mask shown in FIG. 3.
Figure 31:
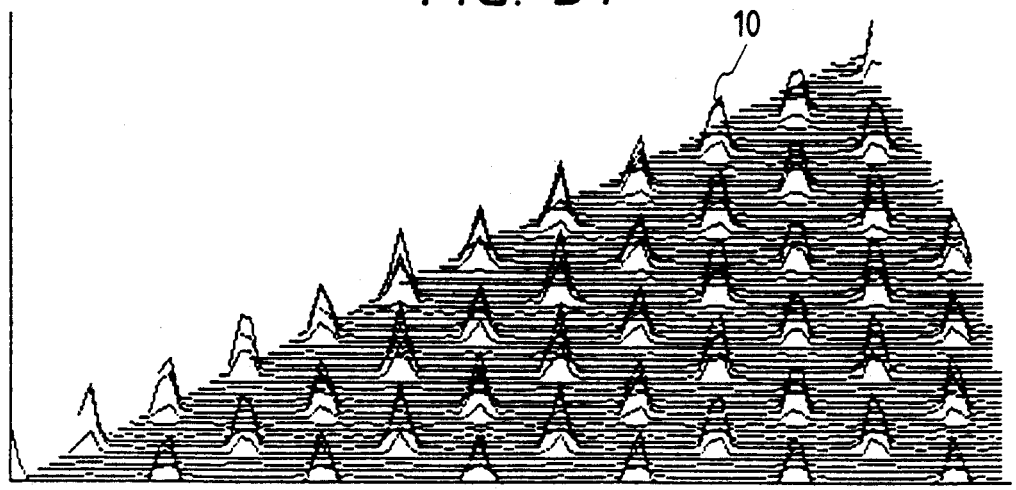
FIG. 31 is a view showing a diffusion distribution of a focusing screen manufactured by the mask shown in FIG. 30.

When the mask 40A formed as described above is used, a new cycle having a larger cycle than that of the mask pattern (FIG. 3), as shown in FIG. 30. This new cycle is directly transferred to the focusing screen. A focusing screen formed by using the mask 40A shown in FIG. 30 has a diffusion distribution, as shown in FIG. 31. As compared with the conventional arrangement of FIG. 5, the number of bright points 10 is apparently and greatly increased. In this case, the illustrated diffusion distribution is its part (i.e., the 30° range) of the whole distribution.

Figure 32:
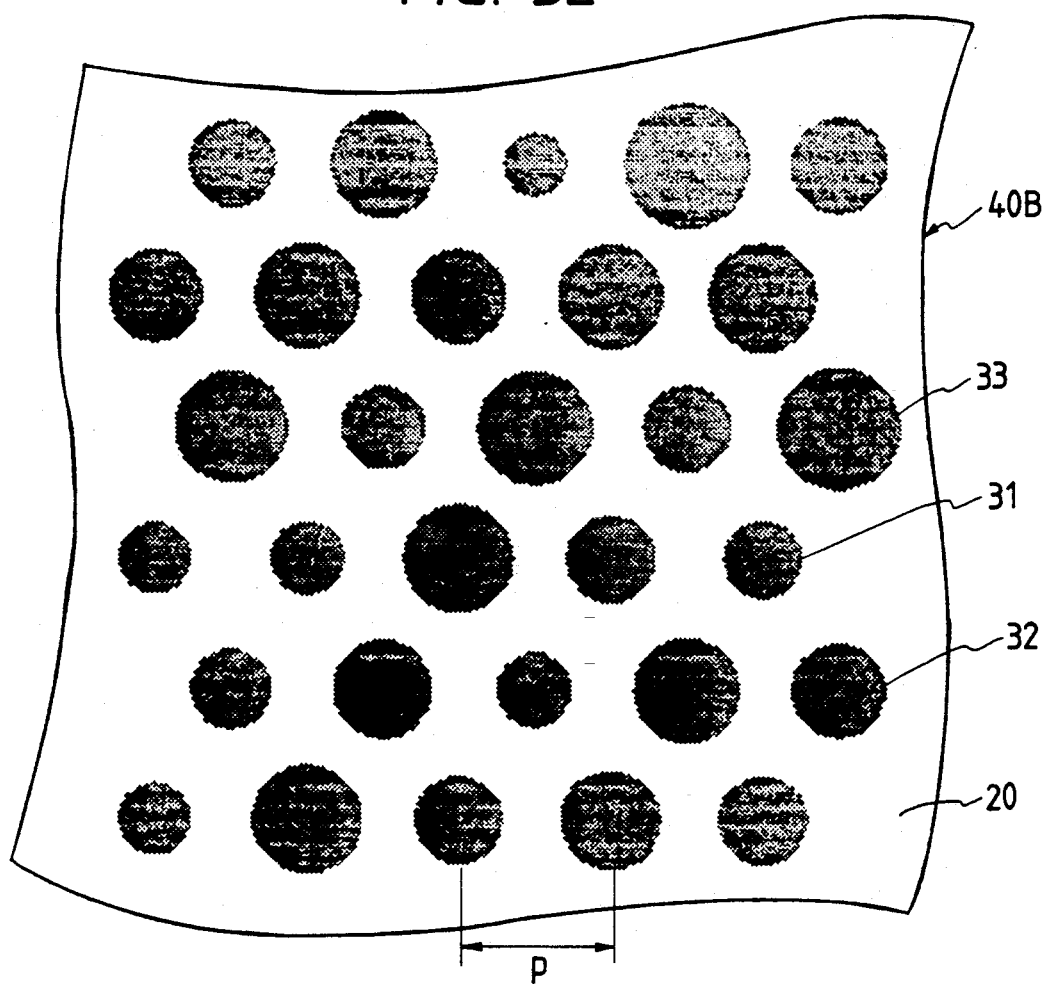
FIG. 32 is a view showing an arrangement of a mask used in another embodiment of a method of manufacturing the focusing screen according to the third aspect of the present invention.

FIG. 32 is a plan view showing an arrangement of a mask according to another embodiment of a method of manufacturing a focusing screen of the present invention. The same reference numerals as in the previous embodiments denote the same parts in FIG. 32, and a detailed description thereof will be omitted. A random Q pattern is employed in the dimensions of the micropatterns 31, 32, and 33:

$$0 < Q(r_3 - r_1)/3$$

Dimensions r of the micropatterns 31, 32, and 33 in FIG. 32 are defined as follows:

$$r = r_i + Q \times RAD$$

for i = 1, 2, or 3 wherein RAD is a random variable falling within the range of $-1$ to $+1$.

Figure 33:
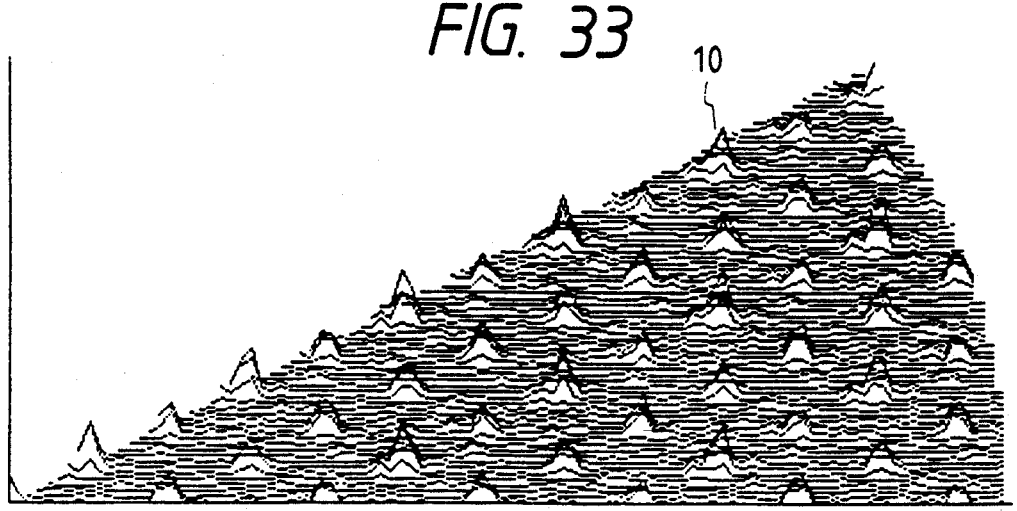
FIG. 33 is a view showing a diffusion distribution of a focusing screen manufactured by the mask shown in FIG. 32.

When the mask 40B formed as described above is used, a focusing screen formed by using this mask has a diffusion distribution, as shown in FIG. 33. In this diffusion distribution, bright points 10 are unnoticeable and have a random pattern. The moiré with the Fresnel lens is also unnoticeable. The coarse texture is not observable in this random pattern.

Figure 4:
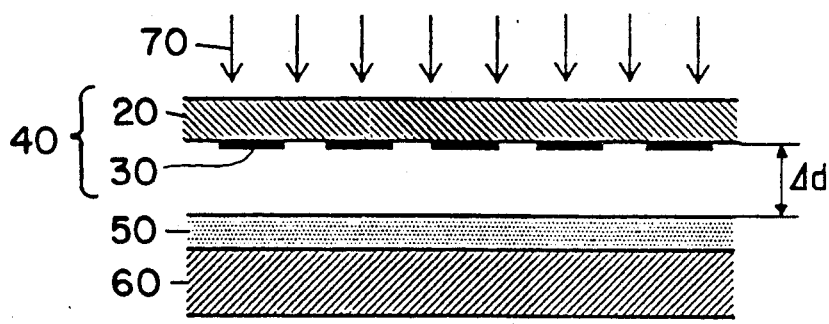
FIG. 4 is a view for explaining a proximity exposure method.
Figure 34:
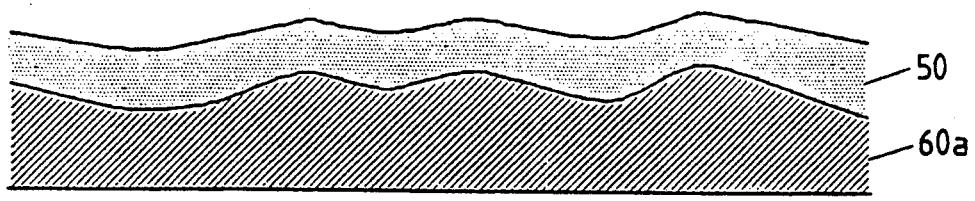
FIG. 34 is a view showing a substrate having micropatterned projections thereon.

In order to use the weak random pattern, a substrate 60A having micropatterned projections preformed thereon, as indicated by the section of FIG. 34, can be used in the proximity exposure method of FIG. 4.

Figure 35:
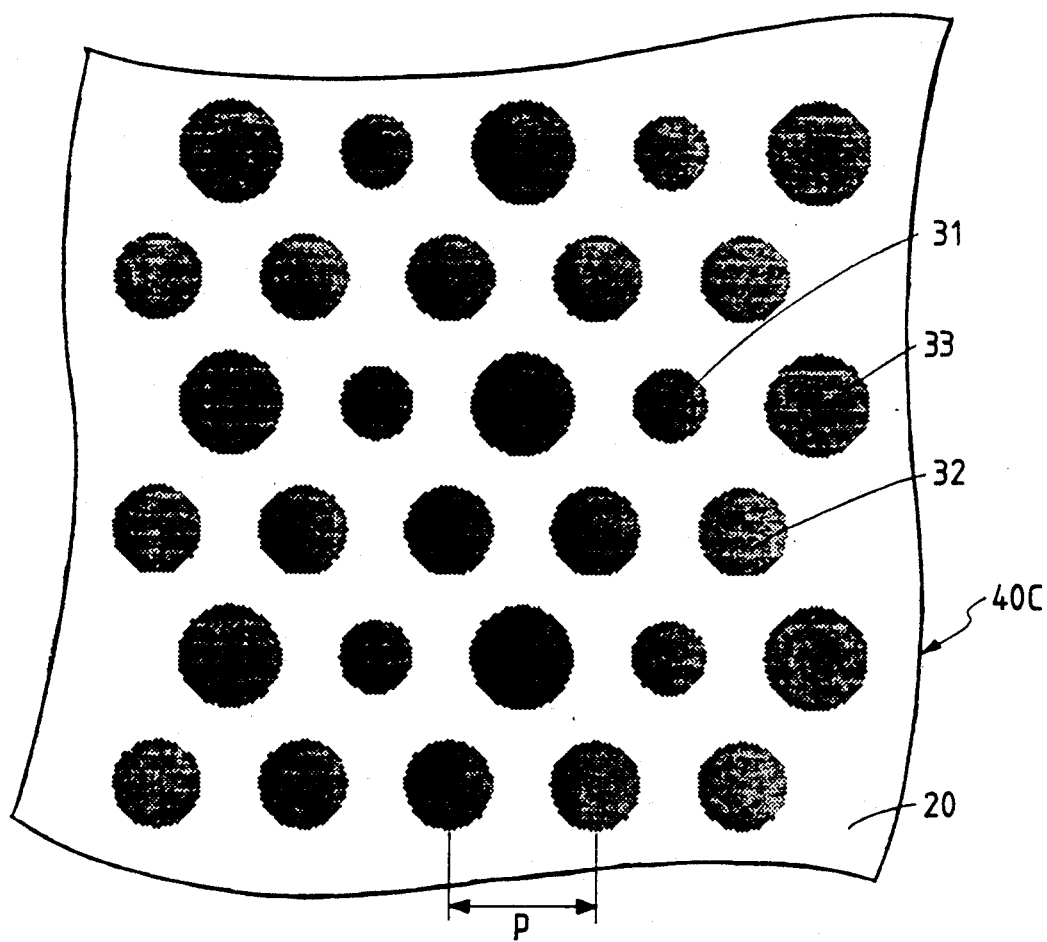
FIG. 35 is a view showing an arrangement of a mask used in still another embodiment of a method of manufacturing the focusing screen according to the third aspect of the present invention.
Figure 36:
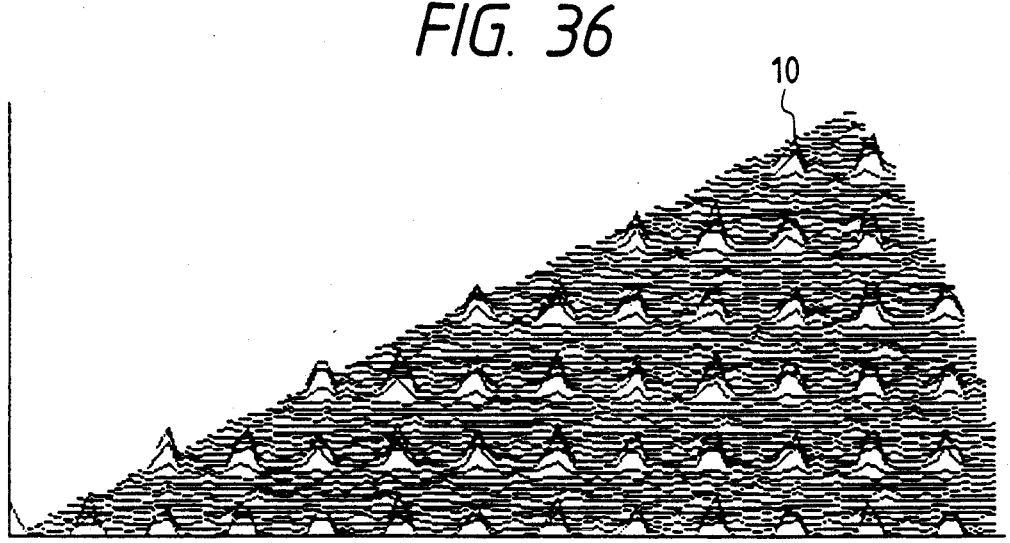
FIG. 36 is a view showing a diffusion distribution of a focusing screen manufactured on the substrate of FIG. 34 by using the mask shown in FIG. 35.
Figure 37:
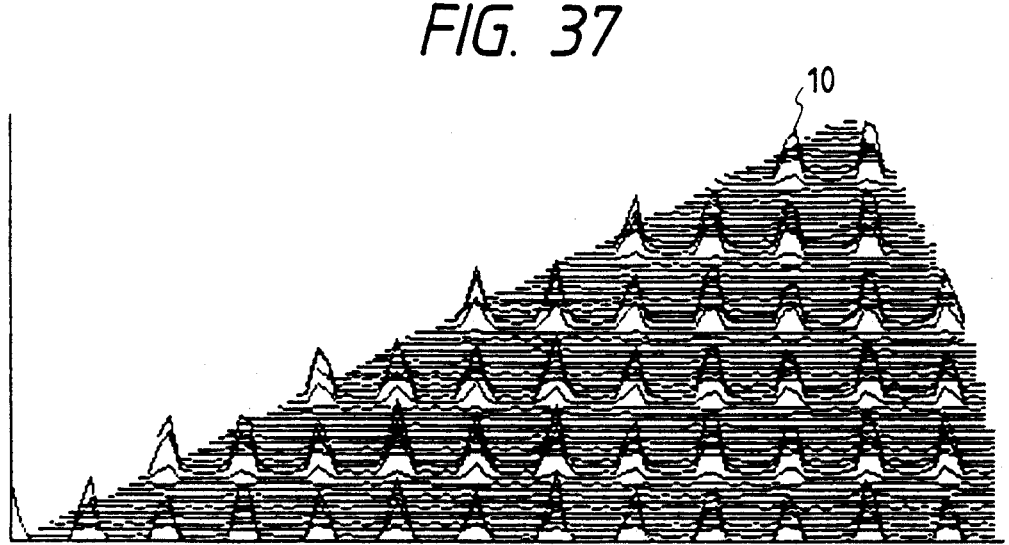
FIG. 37 is a view showing a diffusion distribution of a focusing screen manufactured by the mask shown in FIG. 35.

In practice, the diffusion characteristics of a focusing screen manufactured using a mask 40C of FIG. 35 and a substrate 60A of FIG. 34 in another embodiment of the present invention are shown in FIGS. 36 and 37. Bright points 10 of FIG. 36 are less conspicuous than those of FIG. 37 as is apparent from the relationship between FIGS. 31 and 33. The coarse texture is not observable by this random pattern.

Figure 38:
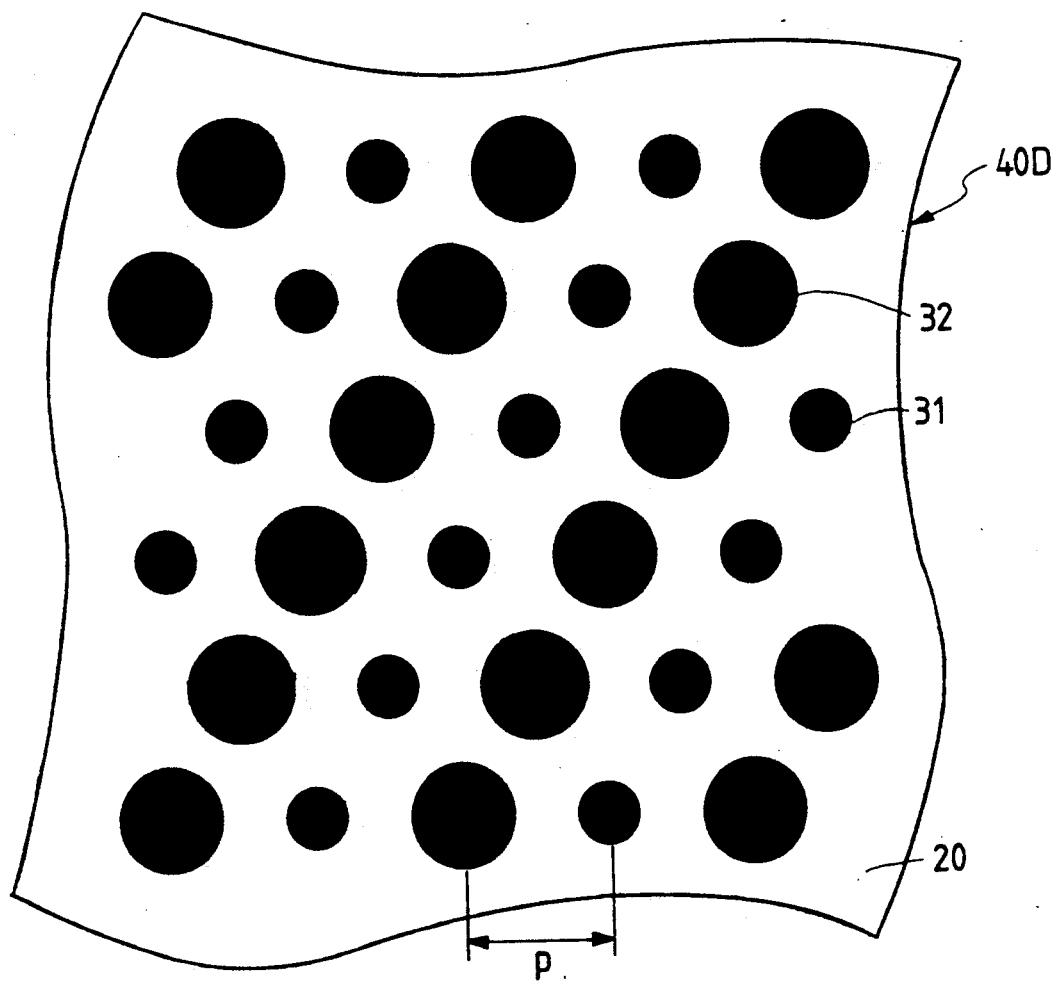
FIG. 38 is a view showing an arrangement of a mask used in still another embodiment of the method of manufacturing the focusing plate according to the third aspect of the present invention.
Figure 39:
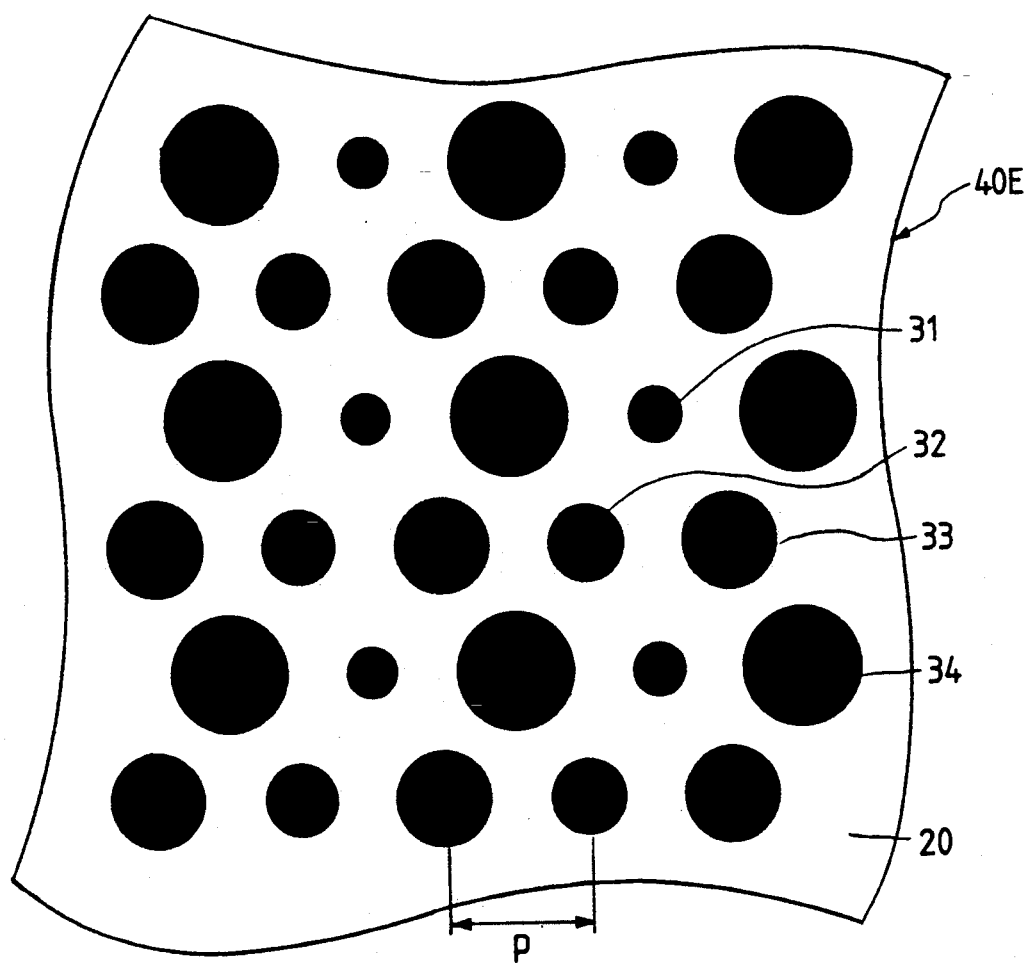
FIG. 39 is a view showing an arrangement of a mask used in still another embodiment of a method of manufacturing the focusing screen according to the third aspect of the present invention.

In the above embodiments, the number of dimensions of the micropatterns is given as 3 (n=3). The present invention, however, is not limited to these. As shown in FIG. 38, a mask 40D having micropatterns having two different dimensions (n=2) may be used. Alternatively, as shown in FIG. 39, a mask 40E having micropatterns having four different dimensions (n=4) may be used. In addition, random patterns may be used in these micropatterns.

In the above embodiments, the shape of the micropatterns of the mask is circular. The present invention, however, is not limited to this shape. For example, a regular polygonal shape such as a regular hexagonal or octagonal shape may be used to obtain the same effect as described above.

What is claimed is:

1. In a focusing screen having a large number of microlenses regularly distributed in an array, the improvement wherein said microlenses are substantially uniformly cross-dimensioned and arranged as a plurality of intermingled groups, with the microlenses of each group having a predetermined height different from that of the microlenses of each other group and occupying a respective cyclical pattern of positions within said array.

2. In a focusing screen having a large number of microlenses regularly distributed in an array, the improvement wherein said microlenses are arranged as a plurality of intermingled groups, with the microlenses of each group having heights which are randomly distributed within a predetermined range about a predetermined central height value, the central height value being different for each group, and the microlenses of each group occupying a respective cyclical pattern of positions within said array.

3. A focusing screen according to claim 2, wherein the microlenses of said array are substantially uniformly cross-dimensioned.

4. A focusing screen according to claim 2, wherein a width of said predetermined range is the same for each said group.

5. A focusing screen according to claim 4, wherein the microlenses of said array are substantially uniformly cross-dimensioned.

6. A focusing screen according to claim 2, wherein for each said group, a width R of said predetermined range is defined as follows:

$$0 < R < 1.5Q/(n-1)$$

where Q is the difference between the maximum and minimum central height values and n is the number of said groups.

7. A focusing screen according to claim 6, wherein the width of said predetermined range is the same for each said group.

8. A focusing screen according to claim 7, wherein the microlenses of said array are substantially uniformly cross-dimensioned.

* * * * *